United States Patent
Sugimoto et al.

(10) Patent No.: US 11,252,112 B2
(45) Date of Patent: Feb. 15, 2022

(54) MESSAGE PROVIDING DEVICE, NON-TRANSITORY COMPUTER READABLE MEDIUM STORING PROGRAM, AND DISPLAY CONTROL METHOD

(71) Applicant: FUJIFILM Business Innovation Corp., Tokyo (JP)

(72) Inventors: Hideaki Sugimoto, Kanagawa (JP); Shigeo Miyata, Kanagawa (JP); Hiroyuki Mitsuhashi, Kanagawa (JP); Xiaojing Zhang, Kanagawa (JP); Shiori Oikawa, Kanagawa (JP); Yu Mishima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 356 days.

(21) Appl. No.: 16/211,244

(22) Filed: Dec. 6, 2018

(65) Prior Publication Data
US 2019/0288963 A1   Sep. 19, 2019

(30) Foreign Application Priority Data

Mar. 16, 2018   (JP) .............................. JP2018-049871

(51) Int. Cl.
| | |
|---|---|
| *G06F 15/16* | (2006.01) |
| *H04L 12/58* | (2006.01) |
| *G06F 3/12* | (2006.01) |
| *H04L 29/08* | (2006.01) |

(52) U.S. Cl.
CPC ............ *H04L 51/02* (2013.01); *G06F 3/1204* (2013.01); *G06F 3/1236* (2013.01); *G06F 3/1288* (2013.01); *H04L 51/046* (2013.01); *H04L 67/16* (2013.01)

(58) Field of Classification Search
CPC ........................................................ H04L 51/02
USPC .......................................................... 709/206
See application file for complete search history.

(56) References Cited

U.S. PATENT DOCUMENTS

| | | | | |
|---|---|---|---|---|
| 9,325,651 | B2 * | 4/2016 | Sakuta ................... | H04L 51/18 |
| 2002/0042267 | A1 * | 4/2002 | Kim ..................... | G06F 3/1261 |
| | | | | 455/418 |
| 2003/0007171 | A1 * | 1/2003 | Simpson ............... | G06F 3/1287 |
| | | | | 358/1.15 |

(Continued)

FOREIGN PATENT DOCUMENTS

| | | |
|---|---|---|
| JP | 2014164522 | 9/2014 |
| JP | 2019144698 | 8/2019 |

OTHER PUBLICATIONS

"Office Action of Japan Counterpart Application" with English translation thereof, dated Dec. 21, 2021, p. 1-p. 5.

*Primary Examiner* — Anthony Mejia
(74) *Attorney, Agent, or Firm* — JCIPRNET

(57) ABSTRACT

A message providing device includes a receiving section that receives a registration request for an association of a software robot program with an external device for each user, the software robot program operating on a message service in which a message is transmitted and received between users, to transmit and receive the message to and from a user, and a registration section that provides plural same software robot programs for one user and registers one or plural different external devices from each other in association with each of the plural same software robot programs in accordance with the request from the user.

22 Claims, 17 Drawing Sheets

(56) References Cited

U.S. PATENT DOCUMENTS

| | | | |
|---|---|---|---|
| 2005/0168772 A1* | 8/2005 | Kim | G06F 3/1244 358/1.15 |
| 2009/0187630 A1* | 7/2009 | Narayanaswami | G06Q 10/107 709/206 |
| 2012/0151100 A1* | 6/2012 | Roche | G06F 3/0481 710/16 |
| 2013/0066987 A1* | 3/2013 | Levinson | H04L 51/04 709/206 |
| 2013/0100485 A1* | 4/2013 | Raza | G06F 3/1204 358/1.15 |
| 2013/0107312 A1* | 5/2013 | Venkatesh | G06F 3/1292 358/1.15 |
| 2013/0219010 A1* | 8/2013 | Mahendran | H04L 61/2046 709/217 |
| 2014/0357226 A1* | 12/2014 | Charugundla | H04W 4/023 455/411 |
| 2015/0370909 A1* | 12/2015 | Volach | H04N 21/4788 707/722 |
| 2016/0218998 A1* | 7/2016 | Sheth | G06F 3/04842 |
| 2017/0237692 A1* | 8/2017 | Sheth | H04W 4/06 715/758 |
| 2017/0324868 A1* | 11/2017 | Tamblyn | H04M 3/58 |
| 2018/0227251 A1* | 8/2018 | Takishima | G06F 3/1204 |
| 2019/0018974 A1* | 1/2019 | Chae | H04L 67/06 |
| 2019/0213003 A1* | 7/2019 | Burlitskiy | G06F 8/34 |
| 2019/0258431 A1* | 8/2019 | Yamamoto | G06F 3/1222 |
| 2019/0306341 A1* | 10/2019 | Matysiak | G06F 3/1292 |
| 2020/0034589 A1* | 1/2020 | Calhoun | G06Q 30/01 |
| 2020/0065523 A1* | 2/2020 | Fukuda | H04L 51/02 |
| 2020/0143797 A1* | 5/2020 | Manoharan | G10L 15/16 |

\* cited by examiner

| | USER | PRINTER | COLOR | SIZE | NUMBER OF COPIES |
|---|---|---|---|---|---|
| 001 | USER A | PRINTER A | COLOR | A3 | 1 |
| 002 | USER B | PRINTER B | BLACK AND WHITE | Letter | 2 |
| ... | | | | | |

FIG. 8
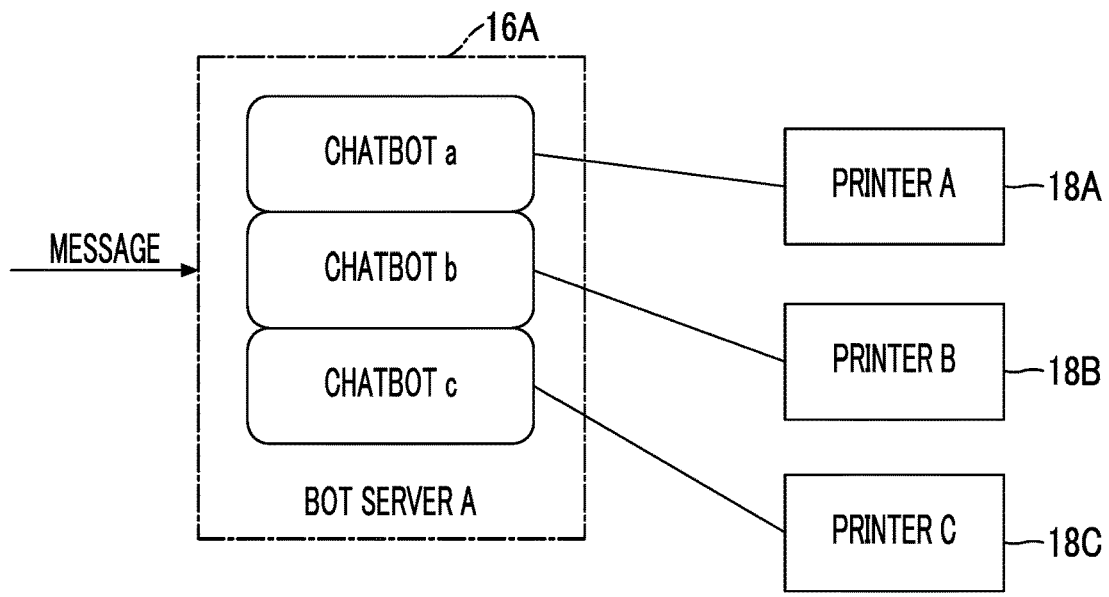
FIG. 9
| CHATBOT | USER A | USER B | USER C |
|---|---|---|---|
| CHATBOT a | PRINTER A | PRINTER B | PRINTER A |
| CHATBOT b | PRINTER B | PRINTER C | |
| CHATBOT c | PRINTER C | | |
FIG. 10
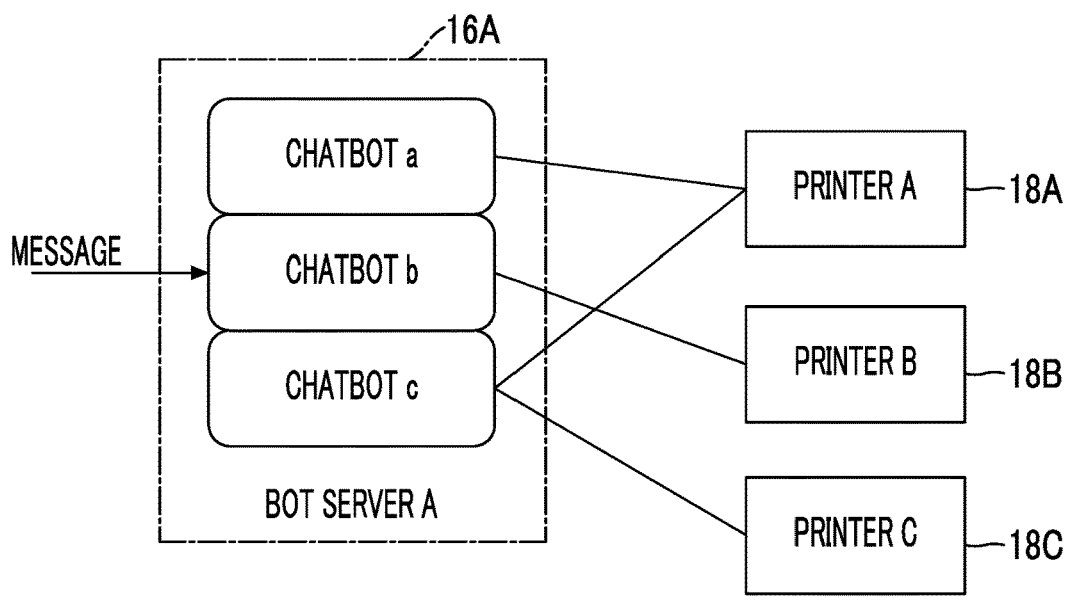

FIG. 13A
| USER | BOT | PRINTER | DEFAULT |
|---|---|---|---|
| USER A | BOT a | PRINTER A | V |
| | | (no entry) | |
| | BOT b | (no entry) | |
| | | (no entry) | |
FIG. 13B
| USER | BOT | PRINTER | DEFAULT |
|---|---|---|---|
| USER A | BOT a | PRINTER A | |
| | | PRINTER B | V |
| | BOT b | (no entry) | |
| | | (no entry) | |
FIG. 13C
| USER | BOT | PRINTER | DEFAULT |
|---|---|---|---|
| USER A | BOT a | PRINTER A | |
| | | PRINTER B | V |
| | BOT b | PRINTER C | V |
| | | (no entry) | |

| BOT | PRINTER | DEFAULT | NUMBER OF TIMES OF SWITCHING | NUMBER OF TIMES OF BEING USED |
|---|---|---|---|---|
| BOT a | PRINTER A | | 10 | 20 |
| | PRINTER B | V | 10 | 25 |
| | | | | |
| BOT b | (no entry) | | | |
| | (no entry) | | | |

| BOT | PRINTER | DEFAULT | NUMBER OF TIMES OF SWITCHING | NUMBER OF TIMES OF BEING USED |
|---|---|---|---|---|
| BOT a | (no entry) | | | |
| | PRINTER B | V | 10 | 25 |
| | | | | |
| BOT b | PRINTER A | V | 1 | 1 |
| | (no entry) | | | |

FIG. 20A

| BOT | PRINTER AND PRINTING CONDITION | DEFAULT | NUMBER OF TIMES OF SWITCHING | NUMBER OF TIMES OF BEING USED |
|---|---|---|---|---|
| BOT a | PRINTER A, P1 | | 10 | 20 |
| | PRINTER A, P2 | V | 10 | 25 |
| | PRINTER B | | 2 | 4 |
| BOT b | (no entry) | | | |
| | (no entry) | | | |

FIG. 20B

| BOT | PRINTER AND PRINTING CONDITION | DEFAULT | NUMBER OF TIMES OF SWITCHING | NUMBER OF TIMES OF BEING USED |
|---|---|---|---|---|
| BOT a | (no entry) | | | |
| | PRINTER A, P2 | V | 10 | 25 |
| | PRINTER B | | 2 | 4 |
| BOT b | PRINTER A, P1 | V | 1 | 1 |
| | (no entry) | | | |

MESSAGE PROVIDING DEVICE, NON-TRANSITORY COMPUTER READABLE MEDIUM STORING PROGRAM, AND DISPLAY CONTROL METHOD

CROSS-REFERENCE TO RELATED APPLICATIONS

This application is based on and claims priority under 35 USC 119 from Japanese Patent Application No. 2018-049871 filed Mar. 16, 2018.

BACKGROUND

(i) Technical Field

The present invention relates to a message providing device, a non-transitory computer readable medium storing a program, and a display control method.

(ii) Related Art

JP2014-164522A discloses a message notification device that performs notification of a message that reports a result of an operation instruction from a user with an explicit indication of a destination of the message. An operation instruction detection unit detects an operation instruction from a message and specifies a member who has written the message as an instructor. A report message display unit visually shows a message indicating a result obtained by an operation in accordance with the operation instruction, on a family message board in a state where the instructor is described as a destination.

In a message service such as a chatting or a social networking service (SNS), in which a message is transmitted and received between users, a software robot program (referred to as "a chatbot" below) is proposed. The chatbot operates on the message service and is designed (personified) in order to simulate a dialogue with a person with sound or texts. The chatbot operates to detect a specific word or phrase from a message input from a user and to output a response which has been prepared in advance corresponding to the detected word or phrase. For the chatbot, messenger service accounts assigned for advertisements or commercials, such as companies or stores are operated. A user can enjoy talking with the chatbot through natural message exchange, and can cause the chatbot to execute various services.

SUMMARY

The software robot program may provide various services in cooperation with an external device. In a case where it is assumed that one software robot program cooperates with a plurality of external devices, a switching operation between the plurality of external devices is required for a user executing a desired service. Thus, the operation becomes complicated.

Aspects of non-limiting embodiments of the present disclosure relate to a message providing device, a non-transitory computer readable medium storing a program, and a display control method that reduce the number of switching operations between a plurality of external devices, in a case where a service is performed, in a configuration in which one software robot program provides the service in cooperation with the plurality of external devices, in comparison to a case where only one software robot program is provided for one user.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided a message providing device which includes a receiving section that receives a registration request for an association of a software robot program with an external device for each user, the software robot program operating on a message service in which a message is transmitted and received between users, to transmit and receive the message to and from a user, and a registration section that provides a plurality of the same software robot programs for one user and registers one or a plurality of external devices different from each other in association with each of the plurality of the same software robot programs, in accordance with the request from the user.

BRIEF DESCRIPTION OF THE DRAWINGS

Exemplary embodiment(s) of the present invention will be described in detail based on the following figures, wherein:

FIG. 8 is a diagram (part 1) illustrating an association between a plurality of chatbots and printers in the first exemplary embodiment;

FIG. 9 is a diagram illustrating the setting information table in the first exemplary embodiment;

FIG. 10 is a diagram (part 2) illustrating the association between the plurality of chatbots and the printers in the first exemplary embodiment;

FIGS. 13A to 13C are diagrams illustrating an update of the setting information table in the first exemplary embodiment;

FIGS. 20A and 20B are diagrams illustrating an update of a setting information table in a fifth exemplary embodiment.

DETAILED DESCRIPTION

Hereinafter, exemplary embodiments of the present invention will be described with reference to the drawings, by using an example in which a chatbot that provides a print service in accordance with a message from a user is used.

First Exemplary Embodiment

Figure 1:
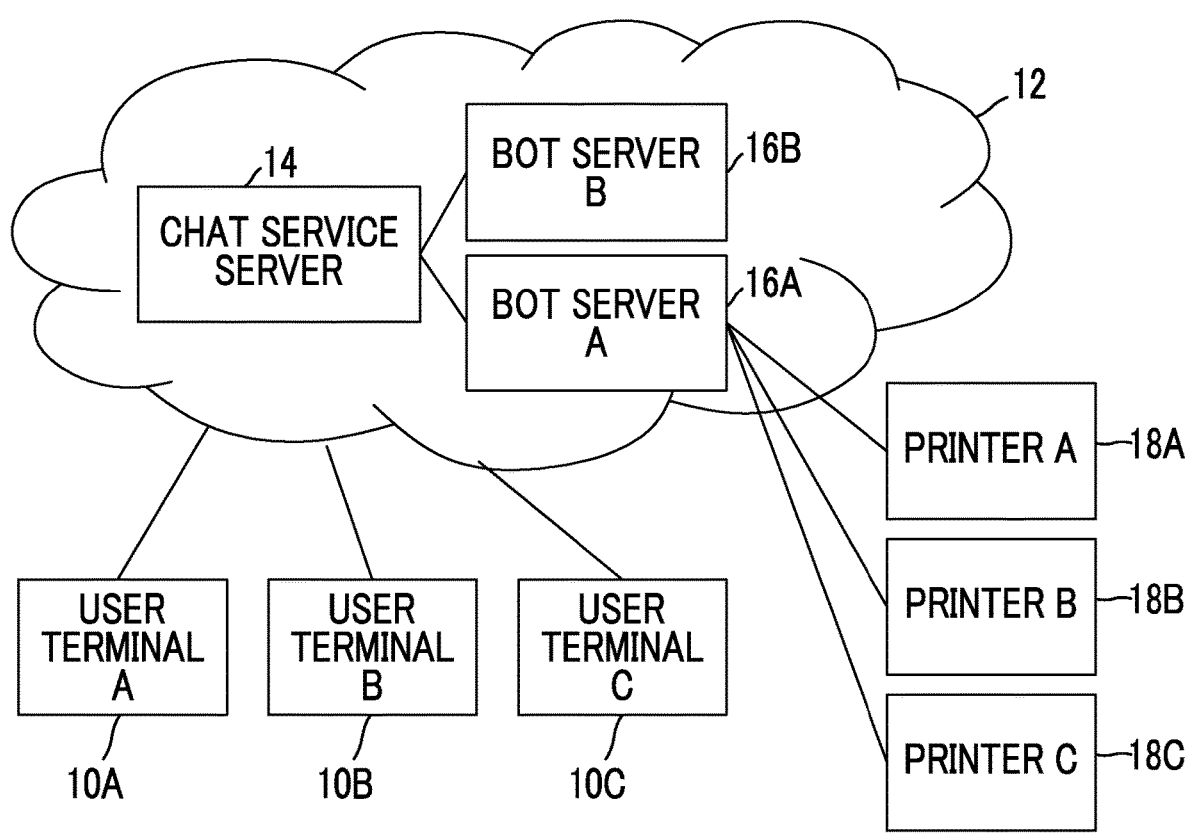
FIG. 1 is a system configuration diagram according to a first exemplary embodiment.

FIG. 1 is an overall configuration diagram illustrating a message service system according to an exemplary embodiment. The message service system includes a user terminal A (10A) to a user terminal C (10C), a chat service server 14, a bot server A (16A) to a bot server B (16B), and a printer A (18A) to a printer C (18C).

The user terminal A (10A) to the user terminal C (10C) are terminals used by a user of a message service. Information terminals such as smartphones, tablet terminals, or personal computers (PCs) are provided as the user terminals. FIG. 1 illustrates three terminals of the user terminal A (10A), the user terminal B (10B), and the user terminal C (10C), but the number of user terminals is randomly determined. Users operate the user terminal A (10A) to the user terminal C (10C) to access the chat service server 14 on a cloud 12 and to transmit and receive messages to and from other users or other chatbots. In the following descriptions, it is assumed that a user A operates the user terminal A, a user B operates the user terminal B, and a user C operates the user terminal C. The user terminal A (10A) to the user terminal C (10C) are connected to the chat service server 14 so as to be capable of transmitting and receiving data to and from each other through a wired or wireless communication network. As an example of a communication network, a public line such as the Internet is provided, and a dedicated line may be provided.

The chat service server 14 is a cloud server disposed on the cloud 12, and is a server that provides a chat service. The chat service server 14 includes one or a plurality of server computers. The chat service server 14 performs the whole processing relating to transmission and reception of a message, for the user terminal A to the user terminal C. Examples of the above processing include processing of transmitting and receiving a message and processing of displaying a display screen in message transmission and reception. The chat service server 14 can form a group with three or more users and process transmission and reception of a message in the group (group chat), in addition to processing of transmission and reception of a message between two users. The chat service server 14 cooperates with the bot server A (16A) and the bot server B (16B), and processes transmission and reception of messages to and from chatbots provided by the bot server 16A and the bot server 16B. Transmission and reception of a message between a user and a chatbot includes transmission and reception of a message between one user and a chatbot, and transmission and reception of messages between a plurality of users and a chatbot.

The bot server A (16A) and the bot server B (16B) function as a message providing device in the exemplary embodiment. In a case where a software robot program of a chatbot that transmits and receives a message to and from a user is installed, the bot server A (16A) and the bot server B (16B) execute the program. For the bot server A (16A) and the bot server B (16B), messenger service accounts assigned for advertisements or commercials, such as companies or stores may be operated.

The bot server A (16A) and the bot server B (16B) cooperate with the chat service server 14 via a specific application programming interface (API), and thus transmits and receives a message to and from a user, automatically generates a response to the message from the user, and transmits a message as the response to the user. The specific API is an API for using the chat service server 14. Any format is used for the API. For example, an API of a javascript object notation (JSON) format is used as the API. Thus, JSON data of a prescribed format is transmitted to a specific URL of the chat service server 14 in a manner of POST or GET. A result is received as data of the JSON format.

In a case where an operation instruction is included in a message from a user, the bot server A (16A) and the bot server B (16B) execute contents of a specific service in accordance with the operation instruction. In the exemplary embodiment, in a case where a message from a user includes a printing instruction, the bot server A (16A) functions as "a print bot" that operates the printer A (18A), the printer B (18B), or the printer C (18C) to perform printing processing, in accordance with the printing instruction. The bot server 16B may provide any service in accordance with an operation instruction from a user. FIG. 1 illustrates two servers of the bot server A (16A) and the bot server B (18B). However, the number of bot servers is randomly determined. A plurality of chatbots may be configured by one bot server.

The bot server A as a chatbot (or a print bot) drives the printer A to the printer C to perform printing processing, according to setting information regarding an operation of the software robot program. The setting information is registered for each user in advance. The setting information can be referred to as an operation condition for operating the printer A to the printer C. For example, a user A operates the user terminal A to input and register setting information for operating the printer A. A user B operates the user terminal B to input and register setting information for operating the printer B.

The printer A (18A), the printer B (18B), and the printer C (18C) perform printing processing by a command from the bot server A.

Figure 2:
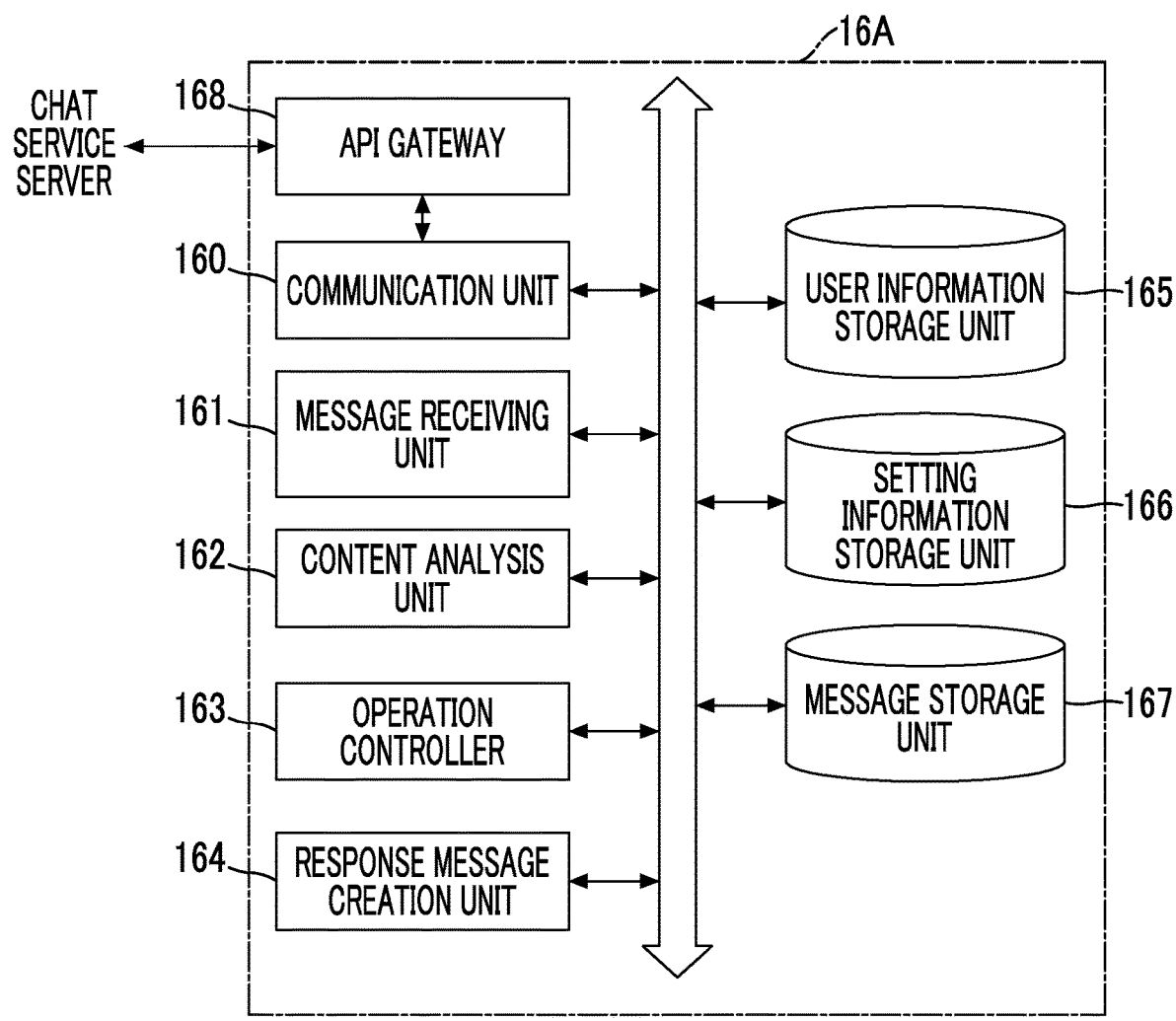
FIG. 2 is a functional block diagram of the first exemplary embodiment.

FIG. 2 is a functional block diagram illustrating the bot server A (16A). The bot server A includes a communication unit 160, a message receiving unit 161, a content analysis unit 162, an operation controller 163, a response message creation unit 164, a user information storage unit 165, a setting information storage unit 166, a message storage unit 167, and an API gateway 168 as functional blocks.

The communication unit 160 communicates with the chat service server 14, the printer A, and the printer B. The communication unit 160 communicates with the chat service server 14 to exchange a message, via the API gateway 168. The communication unit 160 outputs a message received from the chat service server 14 via the API gateway 168, that is, a message from each of the user terminal A to the user terminal C, to the message receiving unit 161. The communication unit 160 transmits a response message created by the response message creation unit 164 to the chat service server 14 (that is, transmits the response message to the user terminal A to the user terminal C) via the API gateway 168. The communication unit 160 outputs a print command to the printer A and the printer B so as to drive the printer A and the printer B, according to a command from the operation controller 163.

The message receiving unit 161 functions as a receiving section, and thus receives a message from the communication unit 160 and outputs the message to the content analysis unit 162. The message includes a message relating to registration of setting information. The message receiving unit 161 sequentially stores the received message in the message storage unit 167.

The content analysis unit 162 analyzes the contents of the received message and outputs the result of the analysis to the operation controller 163. Specifically, the content analysis unit recognizes a user identifier (user ID) included in the received message. The content analysis unit extracts the text part included in the message and analyzes the syntax of the extracted text part. Any method is used as a method of analyzing the syntax. For example, an input message is decomposed into morpheme units, and then nouns, adjectives, verbs, and question pronouns are extracted as keywords. In a case where the text part of a message includes an operation instruction, the content analysis unit 162 analyzes the contents of the operation instruction and outputs the result of the analysis to the operation controller 163. In the exemplary embodiment, the operation instruction includes printing instructions for the printers A to C or instructions regarding pieces of setting information of the printers A to C.

The operation controller 163 functions as a registration section and registers information of the user, the printers A to C in the setting information storage unit 166 with associating the user and the printers A to C with each other, based on an analysis result obtained by the content analysis unit 162. The operation controller 163 outputs a print command to the printers A to C via the communication unit 160.

The response message creation unit 164 creates a response message in accordance with the analysis result in the content analysis unit 162, and transmits the created response message to the chat service server 14 via the communication unit 160.

The user information storage unit 165 stores information of a user using the chat service server 14, in particular, information of a user using a chatbot realized by the bot server A, in a form of a table. Regarding the chatbot, a specific account on a chat service realized by the chat service server 14 is assigned, and a user designates the account and performs a predetermined operation (for example, operation meaning "friend" registration). In this manner, using the chatbot is determined. The user information is, for example, a user ID. The user information storage unit may store information regarding the authority of each user.

The setting information storage unit 166 stores setting information of each user using the chatbot realized by the bot server A, in a form of a table. As items of the setting information, for example, identification information of a printer to be used, a color mode, a paper size, and the number of sheets are provided. However, it is not limited thereto. The setting information may be determined in accordance with the contents of a service provided by the bot server A. In a case of a print service, the setting information is information regarding printing. In a case of a search service, the setting information is information regarding a search condition. The setting information is information for defining the contents of a service, and may include a plurality of items.

The message storage unit 167 stores a message from a user, which has been received by the message receiving unit 161, as a history.

Figure 3:
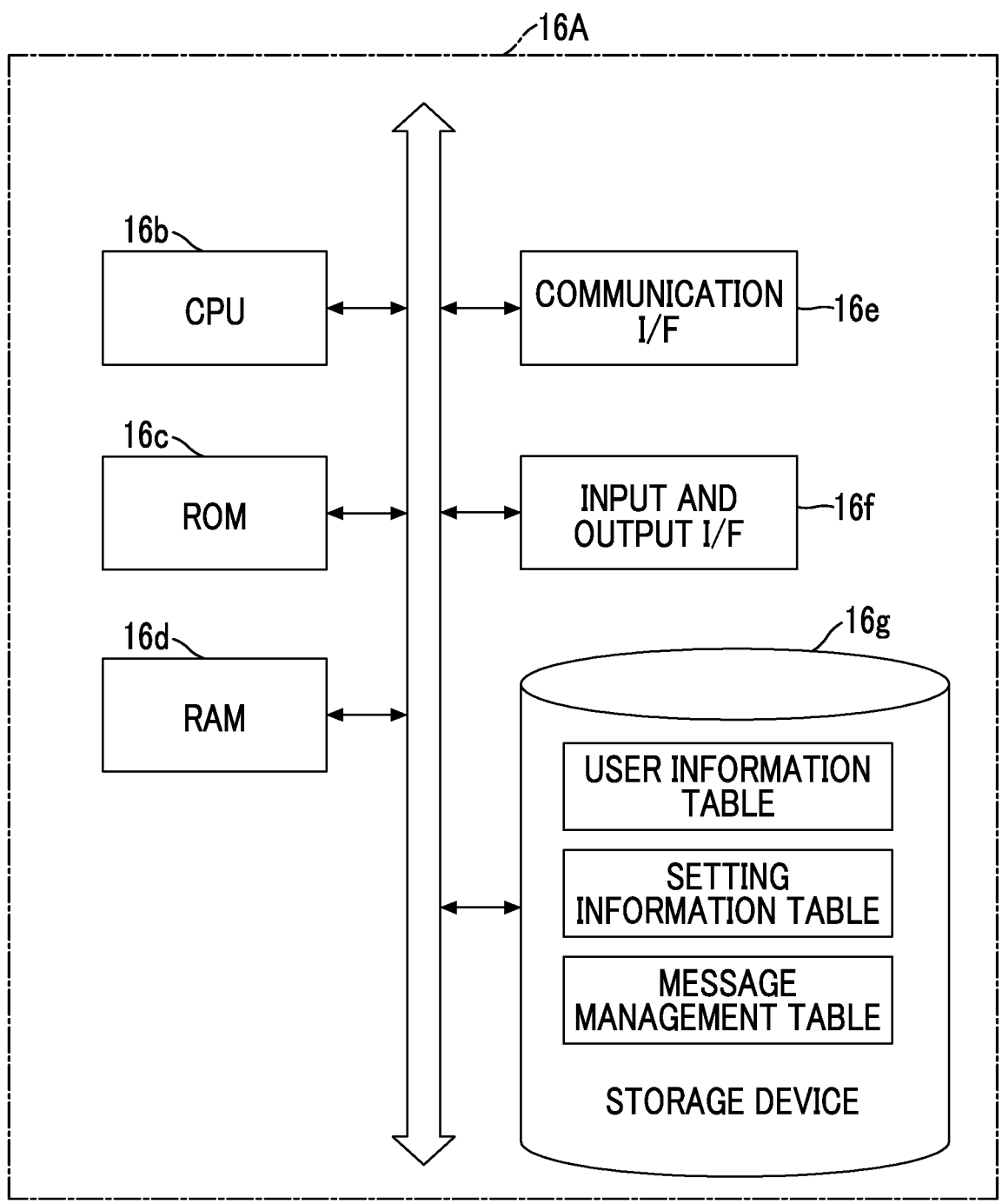
FIG. 3 is a configuration block diagram of the first exemplary embodiment.

FIG. 3 is a configuration block diagram illustrating the bot server A. The bot server A is configured with one or a plurality of server computers. The bot server A includes one or a plurality of CPUs 16b, ROMs 16c, and RAMS 16d, a communication interface (I/F) 16e, an input and output I/F 16f, and a storage device 16g.

The one or plurality of CPUs 16b realizes the function as the chatbot by reading a bot application stored in the ROM 16c or the storage device 16g and using the RAM 16d as a working memory. That is, the CPU 16b automatically responds to a message from a user. In a case where the message from the user includes an operation instruction, the CPU 16b drives the printers A to C in accordance with the operation instruction. The CPU 16b executes the bot application to realize the message receiving unit 161, the content analysis unit 162, the operation controller 163, the response message creation unit 164, and the API gateway 168 in FIG. 2.

The communication I/F 16e transmits and receives a message to and from the chat service server 14 and outputs a print command to the printers A and B.

The input and output I/F 16f transmits and receives data to and from an input device such as a keyboard or a mouse, and an output device such as a display device.

The storage device 16g is configured with a non-volatile memory such as a hard disk drive (HDD) or a solid state drive (SSD). The storage device 16g stores the bot application and stores a user information table, a setting information table, and a message management table. The storage device 16g realizes the user information storage unit 165, the setting information storage unit 166, and the message storage unit 167 in FIG. 2.

In the exemplary embodiment, the CPU executes the software robot program for realizing the chatbot. However, a portion of the chatbot may be realized by hardware processing not processing by executing the program. The hardware processing may be performed, for example, by using a circuit such as an ASIC or a field programmable gate array (FPGA).

Next, registration of setting information will be described with a user A and a user B as an example.

Figures 4, 5:
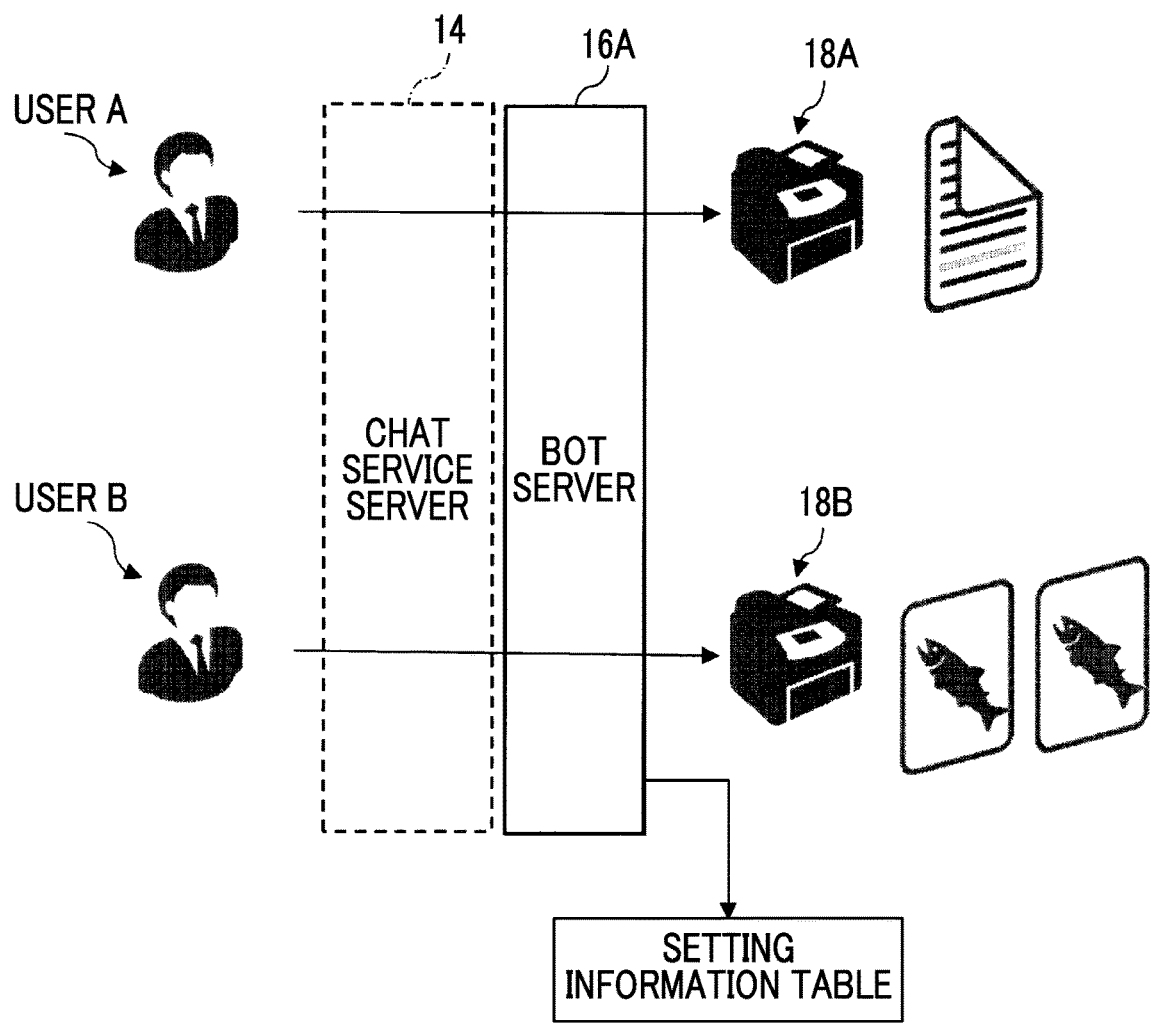
FIG. 4 is diagram (part 1) illustrating setting information registration of the first exemplary embodiment.
FIG. 5 is a diagram illustrating a setting information table.

FIG. 4 schematically illustrates setting information registration processing by the user A and the user B.

In a case where the user A and the user B perform a specific operation ("friend registration") for using a chatbot to which a specific account is assigned on the chat service, the bot server A (16A) assigns user identifiers (user IDs) to the user A and the user B, and assigns printer identifiers (printer ID) for uniquely specifying the printer A to the printer C, to the printer A, the printer B, and the printer C. As the user IDs, accounts themselves of the user A and the user B on the chat service may be employed.

The user A transmits a message to the bot server A (16A) via the chat service server 14, and registers setting information in a state where the printer A, the printer B, or the printer C is specified. For example, the user A transmits a message of designating color as the color mode, A4 as the paper size, and one as the number of sheets, as the setting information in a state where the printer A is specified. In a case where the bot server A receives the message, the bot server A analyzes the contents of the message. In a case where the bot server A analyzes the contents thereof to be setting information, the bot server A registers the setting information in the setting information table in a state where the user A and the printer A are associated with each other.

The above descriptions are similarly applied for the user B. The user B transmits a message to the bot server A (16A) via the chat service server 14, and registers setting information in a state where the printer A or the printer B is specified. For example, the user B transmits a message of designating black and white as the color mode, letter as the paper size, and two as the number of sheets, as the setting information in a state where the printer B is specified. In a case where the bot server A receives the message, the bot server A analyzes the contents of the message. In a case where the bot server A analyzes the contents thereof to be setting information, the bot server A registers the setting information in the setting information table in a state where the user B and the printer B are associated with each other.

FIG. 5 illustrates an example of the setting information table stored in the setting information storage unit 166. A printer, the color (color mode), the size (paper size), the number of copies (number of sheets) are recorded for each user in association with each other. More specifically, identification information of the printer, the color (color mode), the size (paper size), and the number of copies (number of sheets) are recorded for each piece of identification information of a user in association with each other.

Figure 6:
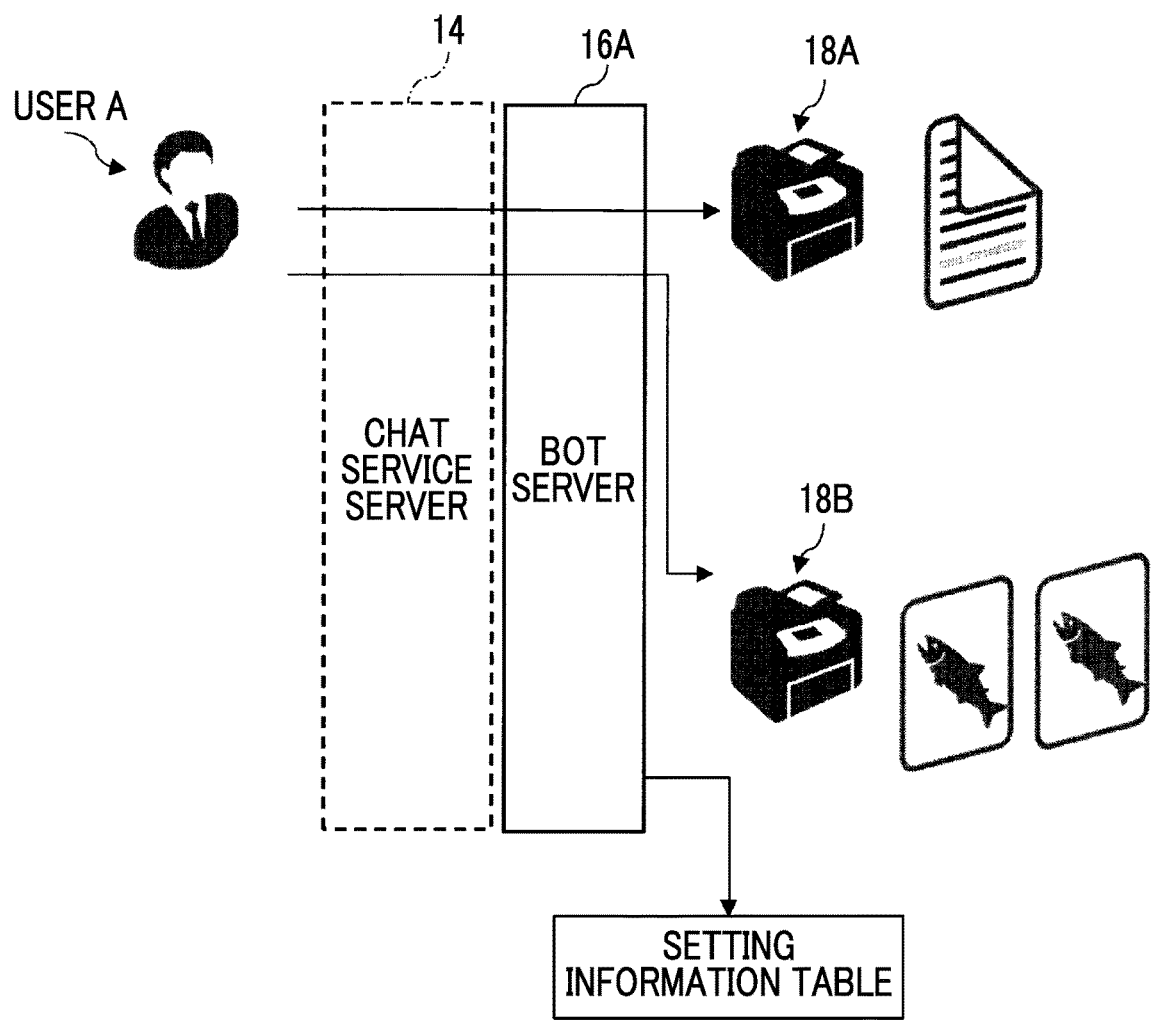
FIG. 6 is a diagram illustrating switching of a printer by the same user.

In many cases, the user A wants registration of different setting information by using not only the printer A but also the printer B. For example, as illustrated in FIG. 6, the user A may register setting information for the printer A, and then register different setting information for the printer B. The user A registers information indicating that the color mode is color, the paper size is A4, and the number of sheets is one, as the setting information for the printer A, and registers information indicating that the color mode is black and white, the paper size is letter, and the number of sheets is 2, as the setting information for the printer B. The bot server A registers the printer A and the setting information for the printer A in association with each other for the user A, and registers the printer B and the setting information for the printer B in the setting information table, in association with the user A. Thus, the bot server A switches the printer between the printer A and the printer B in accordance with an instruction from the user A, and drives the switched printer.

Figure 7:
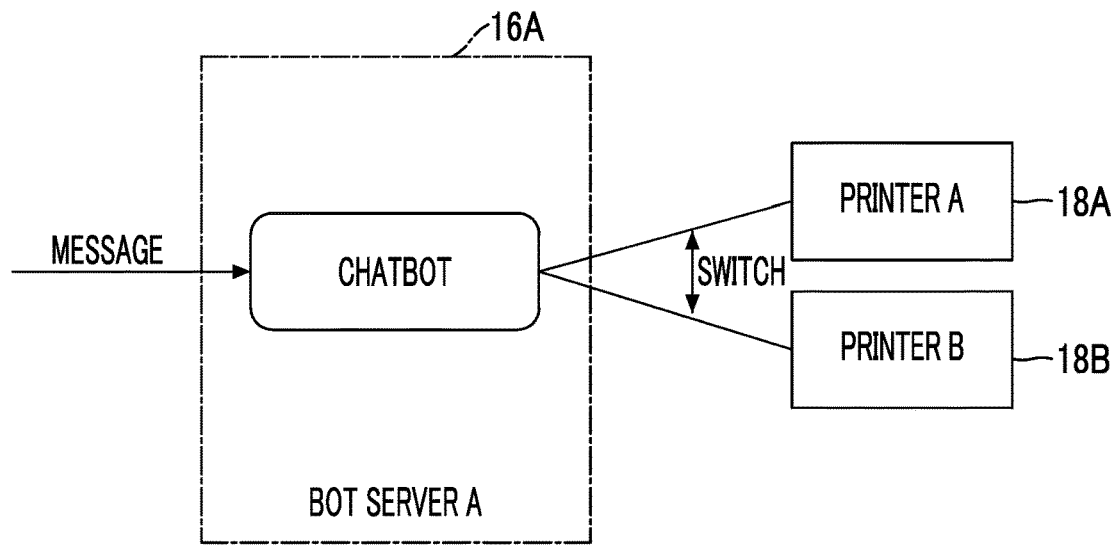
FIG. 7 is a diagram illustrating switching between a plurality of printers by one chatbot.

FIG. 7 schematically illustrates processing of the chatbot realized by the bot server A. The chatbot provides a print service for the user A, in cooperation with the two printers of the printer A and the printer B. The chatbot associates the user A with the printer A and the printer B. The chatbot receives a message from the user A and analyzes the contents of the received message. In a case where the contents of the message indicate the printer A, the chatbot performs switching to the printer A and executes the print service. In a case where the contents of the message indicate the printer B, the chatbot performs switching to the printer B and executes the print service.

At this time, the user A is required to perform an operation of switching between the printer A and the printer B in accordance with the contents in the print service. That is, the operation is complicated. For example, in a case where printing is performed by the printer A, the user A is required to transmit a message indicating that "@printer A: perform printing" to the chatbot. In a case where printing is performed by the printer B, the user A is required to transmit a message indicating that "@printer B: perform printing" to the chatbot. That is, the user A is required to transmit a proper message while paying attention to the printer and the setting information which are associated with each other, and thus the operation is complicated. In particular, in a case where the chatbot provides the print service in cooperation with the printer C, or the printer C or more in addition to the printer A and the printer B, a switching operation becomes complicated depending on the number of printers to be switched.

A configuration in which any of a plurality of printers is set as the default and the default printer is used for a printing instruction may be considered. However, in a case using a printer other than the default printer, similarly, the switching operation is required.

Thus, in the exemplary embodiment, a configuration in which a plurality of chatbots which are the same as each other is set as the chatbot realized by the bot server A and each of the plurality of chatbots cooperates with one or a plurality of printers is made, and thus complication of a printer switching operation by a user is suppressed. Here, "the same chatbot" means a chatbot having the same function and may have a different name and a different appearance. For example, a chatbot a and a chatbot b may be provided as the names of two same chatbots, or a chatbot 1 and a chatbot 2 may be provided as the names of the two same chatbots.

FIG. 8 schematically illustrates processing of the plurality of chatbots realized by the bot server A in the exemplary embodiment.

Three chatbots of chatbots a to c are realized by the bot server A. All the chatbots a to c have the same function. All the chatbots a to c are configured by the same software robot program. The software robot program may be individually installed or may be configured as program modules which constitute the same program and are different from each other.

For example, the chatbot a cooperates with the printer A to provide a print service by driving the printer A in accordance with a message from the user.

For example, the chatbot b cooperates with the printer B to provide a print service by driving the printer B in accordance with a message from the user.

For example, the chatbot c cooperates with the printer C to provide a print service by driving the printer C in accordance with a message from the user.

In a case where a user desires printing by the printer A, the user transmits a message of an operation instruction to "perform printing" and the like, to the chatbot a. In a case where the user desires printing by the printer B, the user transmits a message of an operation instruction to "perform printing" and the like, to the chatbot b. In a case where the user desires printing by the printer C, the user transmits a message of an operation instruction to "perform printing" and the like, to the chatbot c. In only this manner, the user may cause a desired printer to perform printing.

The cooperative relationship between the chatbots a to c and the printers A to C is not fixed and can be dynamically set for each user. For example, the chatbot a may cooperate with the printer B and the chatbot c may cooperate with the printer C, for the user B. The chatbot a may cooperate with the printer A for the user C.

FIG. 9 illustrates a cooperative relationship between the chatbot and the printer for each user, in the exemplary embodiment. For the user A, the chatbot a cooperates with the printer A, the chatbot b cooperates with the printer B, and the chatbot c cooperates with the printer C. For the user B, the chatbot a cooperates with the printer B, and the chatbot b cooperates with the printer C. For the user C, the chatbot a cooperates with the printer A. The chatbots a to c register correspondence relationships with the printer for each user, in the setting information table. The chatbot specifies the corresponding printer with reference to the setting information table, based on the user ID included in a message from a user, and drives the printer.

FIGS. 8 and 9 illustrate a case where one chatbot cooperates with one printer. However, it is not necessarily limited thereto. One chatbot may cooperate with a plurality of printers.

FIG. 10 schematically illustrates another kind of processing of the chatbot.

For example, the chatbot a cooperates with the printer A to provide a print service by driving the printer A in accordance with a message from the user.

For example, the chatbot b cooperates with the printer B to provide a print service by driving the printer B in accordance with a message from the user.

For example, the chatbot c cooperates with the printer A and the printer C to provide a print service by driving the printer A or the printer C in accordance with a message from the user.

In a case where a user desires printing by the printer A, the user transmits a message of an operation instruction to "perform printing" and the like, to the chatbot a. In a case where the user desires printing by the printer B, the user transmits a message of an operation instruction to "perform printing" and the like, to the chatbot b. In a case where the user desires printing by the printer A or the printer C, the user transmits a message of an operation instruction of, for example, "@printer A: perform printing" or "@printer C: perform printing", to the chatbot c. In only this manner, the user may cause a desired printer to perform printing.

In a case where the number of printers with which one chatbot cooperates increases, as described above, the switching operation becomes complicated. Thus, it is desired to limit the upper limit of the number of printers with which one chatbot may cooperate (for example, up to 2).

The chatbot a and the chatbot c cooperate with the printer A together. However, setting information of the printer A with which the chatbot a cooperates may be set to be different from setting information of the printer A with which the chatbot c cooperates.

As described above, it is possible to reduce the labor on the switching operation of the printer by realizing the plurality of chatbots with the bot server A. However, the plurality of chatbots may be prepared in advance. Alternatively, a chatbot may be adaptively added one by one in accordance with a message from the user. That is, one chatbot is set in an initial state. In a case of satisfying a predetermined condition, two chatbots, three chatbots, or more chatbots are sequentially added in accordance with a message from the user.

Figure 11A:
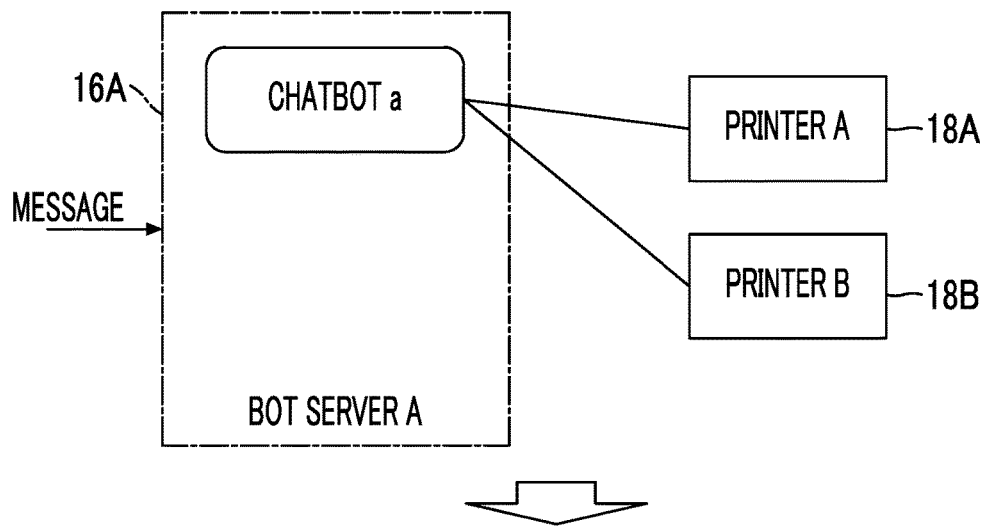
FIGS. 11A to 11C are diagrams illustration addition of a chatbot in the first exemplary embodiment.
Figure 11B:
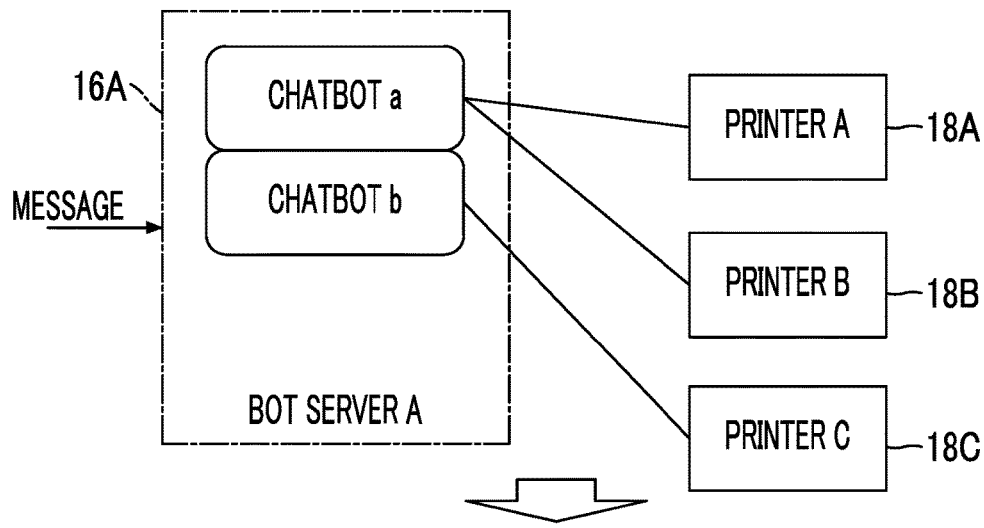
Figure 11C:
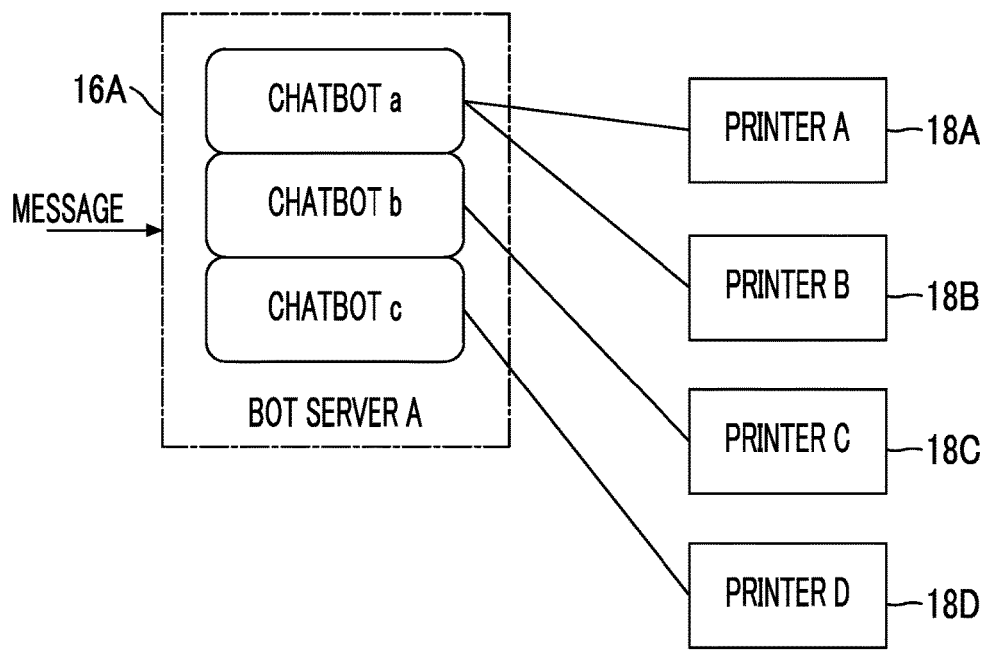

FIGS. 11A to 11C schematically illustrate processing of sequentially adding a chatbot. The upper limit of the number of printers with which one chatbot may cooperate is set to 2, and a case where the number of printers with which the chatbot cooperates is greater than 2 is set as the predetermined condition.

FIG. 11A illustrates an initial state. In the initial state, only one chatbot a is provided, and the chatbot cooperates with the printer A and the printer B.

FIG. 11B illustrates a case where the user desires a print service by the printer C. The number of printers with which the chatbot a cooperates is 2 and reaches the upper limit. Thus, the bot server A determines that the predetermined condition is satisfied, adds the new chatbot b with the chatbot a, and causes the chatbot b to cooperate with the printer C.

FIG. 11C illustrates a case where the user desires a print service by the printer D. Since the chatbot a cooperates with the two printers as the upper limit, and the printer C cooperates with the chatbot which has been newly added, the bot server A adds the new chatbot c with the chatbots a and b and causes the chatbot c to cooperate with the printer D.

In a case where the chatbot b which has been added is caused to cooperate with the printer C, the chatbot a may transmit an automatic response message indicating that the added chatbot b is caused to cooperate with the printer C, to the user. In a case where the chatbot c which has been added is caused to cooperate with the printer D, the chatbot a or the chatbot c may transmit an automatic response message indicating that the added chatbot c is caused to cooperate with the printer D, to the user.

Next, a screen example in a case where the chatbot a cooperates with the printer A, and the user A desires the print service by the printer B and the printer C will be specifically described.

Figure 12:
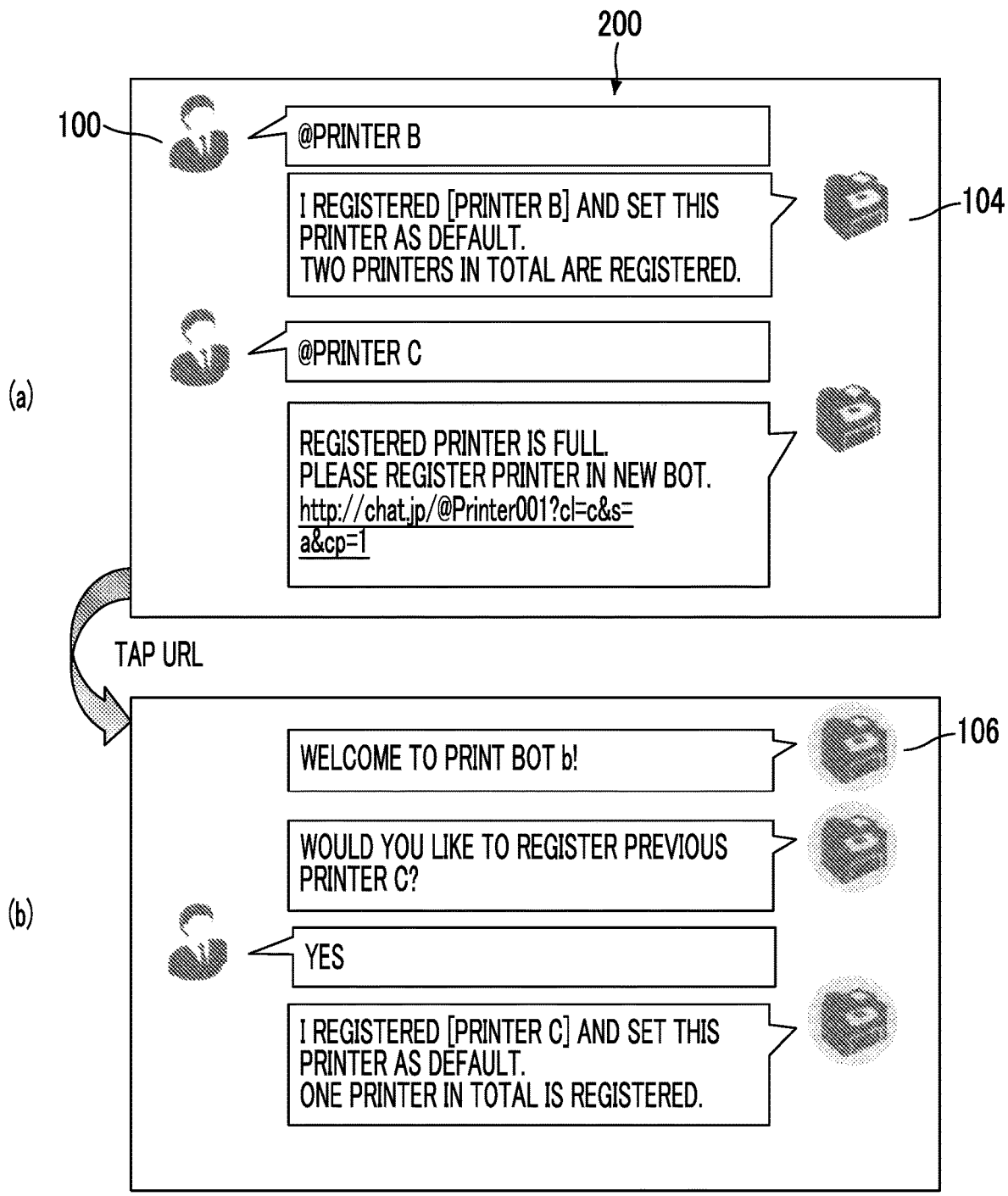
FIG. 12 is a diagram illustrating a screen of a user terminal in the first exemplary embodiment.

FIG. 12 illustrates an example of a screen displayed in the user terminal A operated by the user A. It is assumed that the user A can use the chatbot a ("friend registration" has been performed).

A representation figure (icon) 100 indicating the user A is displayed by the chat service server 14 and an icon 104 indicating the chatbot a realized by the bot server A is displayed, on a screen of the user terminal A. Messages 200 between the user A and the chatbot a are displayed in time series from the top to the bottom.

In (a) of FIG. 12, firstly, the user A transmits a message of "@printer B" to the chatbot a.

The chatbot a which has received the message determines that only the printer A is registered in association with the user A and there is still room for another device. Thus, the chatbot a registers the printer B in addition to the printer A, in a setting information table, in association with the user A. The chatbot a creates a message of "I registered the printer B and set this printer as the default. Two printers in total are registered" and automatically transmits the created message as a response.

Then, the user A transmits a message of "@printer C" to the chatbot a.

The chatbot a which has received the message determines that the two printers of the printer A and the printer B have already been registered in association with the user A and the upper limit has been reached. The chatbot a creates a message of introducing another chatbot b to the user A and automatically transmits the created message as a response. For example, the chatbot a generates a URL indicating an address of the chatbot b, and automatically transmits the URL along with a message of "the registered printer is full. Please register the printer in the new bot".

The user A who has visually recognized the message taps the URL included in the message so as to access the chatbot b.

(b) of FIG. 12 illustrates a screen displayed in the user terminal A in a case of accessing the chatbot b. On the screen of the user terminal A, the icon 100 indicating the user A is displayed by the chat service server 14 and an icon 106 indicating the chatbot b realized by the bot server A is displayed.

Firstly, the chatbot b creates a message of "welcome to the print bot b" and automatically transmits the message as a response. Since the chatbot b has the same function as that of the chatbot a, the friend registration of the chatbot a is handed over to the chatbot b as it is. Thus, the user A is not required to perform friend registration with the chatbot b again and can immediately use the chatbot b. The user A may perform new friend registration with the chatbot b.

The chatbot b creates a message of "would you like to register the previous printer C?" and automatically transmits the message as a response.

The user A who has visually recognized the message transmits a message of "yes".

The chatbot b which has received the message registers information of the user A and the printer C in the setting information table, with associating the user A and the printer C with each other. The setting information table is commonly used by the chatbot a and the chatbot b. However, setting information tables which are individual from each other may be used. The chatbot b creates a message of "I registered the printer c and set this printer as default. One printer in total is registered", and automatically transmits the message as a response.

Then, the user A transmits a message of a printing instruction to the chatbot a in a case where printing is performed by the printer A or the printer B. The user A transmits a message of a printing instruction to the chatbot b in a case where printing is performed by the printer C.

A processing algorithm of the chatbot a and the chatbot b realized by the bot server A will be described in detail, as follows.

Step 1: The chatbot a receives friend registration from the user A and stores the user ID of the user A in the user information storage unit 165.

Step 2: The chatbot a receives a message regarding a registration request of the printer A from the user A. The chatbot a analyzes the contents of the message, and registers information of the user A and the printer A as the setting information of the user A in the setting information table, with associating the user A and the printer A with each other. The setting information table is stored in the setting information storage unit 166.

Step 3: The chatbot a receives a message regarding a registration request of the printer B from the user A. The chatbot a analyzes the contents of the message, and registers information of the user A and the printer B in the setting information table with associating the user A and the printer B with each other. At this time, the chatbot a determines whether or not the total number of registered printers is greater than the upper limit. In a case where the total number of registered printers is not greater than the upper limit, the chatbot a performs registration.

Step 4: The chatbot a creates a message indicating that two printers of the printer A and the printer B have been registered, and automatically transmits the message as a response to the user A.

Step 5: The chatbot a receives a message regarding a registration request of the printer C from the user A, and analyzes the contents of the message. The total number of printers associated with the user A already reaches the upper limit. Thus, in a case where the printer C is associated, the total number of printers is greater than the upper limit. Accordingly, the chatbot a rejects registration of the printer C, and a chatbot b having the same function is added. A message indicating the number of registered printers reaches the upper limit and a message including an address information (URL and the like) for accessing the chatbot b are created and automatically transmitted as a response.

Step 6: In a case where the user A accesses the chatbot b, the chatbot b creates a confirmation message of whether or not registration of the printer C of which the registration has been rejected by the chatbot a is performed, and automatically transmits the confirmation message as a response.

Step 7: In a case where the chatbot b receives a message as a positive response from the user A, the chatbot b analyzes the contents of the message and registers information of the user A and the printer C as setting information of the user A in the setting information table with associating the user A and the printer C with each other.

Step 8: The chatbot b creates a message indicating that the printer C has been registered, and automatically transmits the message to the user A as a response.

FIG. 13 schematically illustrates an update of the setting information table.

FIG. 13A illustrates the setting information table in the initial state. The chatbot a (bot a) and the printer A are associated with each other for the user A. The "V" mark in the field of "default" indicates a printer corresponding to the "V" mark is set as the default printer. The printer is not associated with the chatbot b (bot b).

FIG. 13B illustrates the setting information table updated in accordance with the message of "@printer B" from the user A. The chatbot a (bot a) is associated with the printer A and the printer B for the user A. The printer B is set as the default printer.

FIG. 13C illustrates the setting information table updated in accordance with the message of "@printer C" from the user A. The chatbot b and the printer C are associated with each other for the user A. The printer C is set as the default printer.

Figure 14:
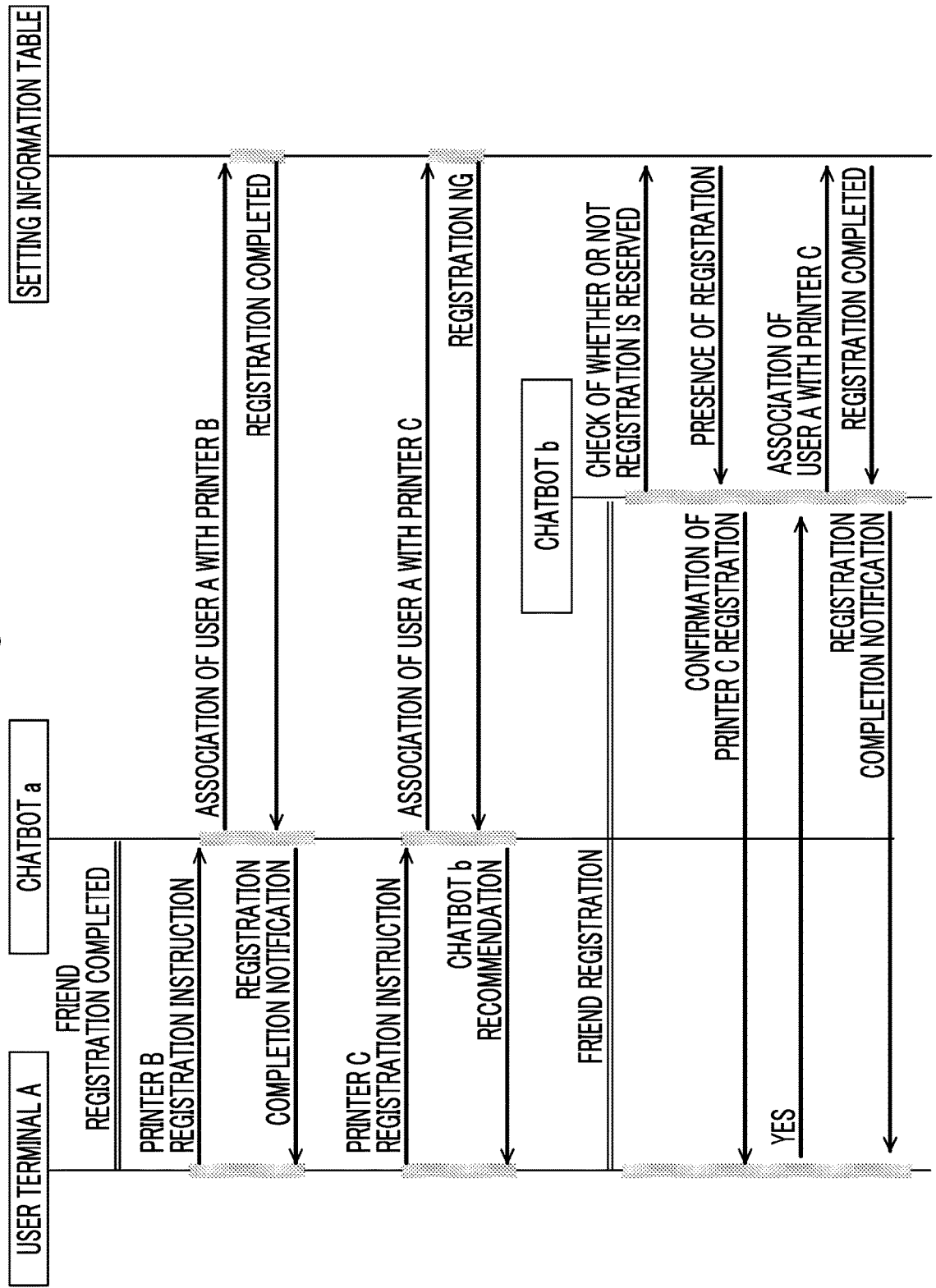
FIG. 14 is a sequence chart of the first exemplary embodiment.

FIG. 14 is a sequence chart of the exemplary embodiment. FIG. 14 illustrates processing between the user terminal A operated by the user A, the chatbot a, and the chatbot b.

The user A operates the user terminal A to perform friend registration with the chatbot a. Then, the user A transmits a message and registers the printer A.

Then, the user terminal A transmits a registration instruction message of the printer B to the chatbot a. The chatbot a receives the message, and additionally registers the printer B in the setting information table for the user A, in addition to the printer A. In a case where the printer B is additionally registered for the user A, the setting information storage unit 166 that stores the setting information table transmits a registration completion notification to the chatbot a. The chatbot a creates a registration completion message and automatically transmits the message as a response.

Then, the user terminal A transmits a registration instruction message of the printer C to the chatbot a. The chatbot a receives the message, and sets the printer C to be additionally registered in the setting information table for the user A. However, since the number of printers in the setting information table already reaches the upper limit, the setting information storage unit 166 transmits a registration NG notification to the chatbot a. The chatbot a creates a message of recommending a new chatbot b and automatically transmits the message as a response. The user A visually recognizes the response message, and accesses the chatbot b by using the recommended URL or the like. The setting information storage unit 166 sets a flag indicating the registration request of the printer C for the user A has been provided, in the setting information table.

Then, the user A operates the user terminal A to perform friend registration with the chatbot b. The chatbot b may automatically perform friend registration with the user A. In this case, the above registration operation is not required.

The chatbot b confirms that the flag indicating that the registration request of the printer C for the user A has been provided is set (registration reservation), with reference to the setting information table. The chatbot b creates a confirmation message of whether or not the printer C is registered, and automatically transmits the message as a response.

The user terminal A transmits a message of "yes" to the chatbot b in response to the above message. The chatbot b registers the printer C for the user A in the setting information table in response to the message. In a case where the printer C is registered for the user A, the setting information storage unit 166 that stores the setting information table transmits a registration completion notification to the chatbot b. The chatbot b creates a registration completion message and automatically transmits the message as a response.

Second Exemplary Embodiment

In the first exemplary embodiment, the chatbot a and the chatbot b exchanges a message with the user A in different chat rooms. However, the chatbot a and the chatbot b may exchange a message with the user A in the same chat room.

Figure 15:
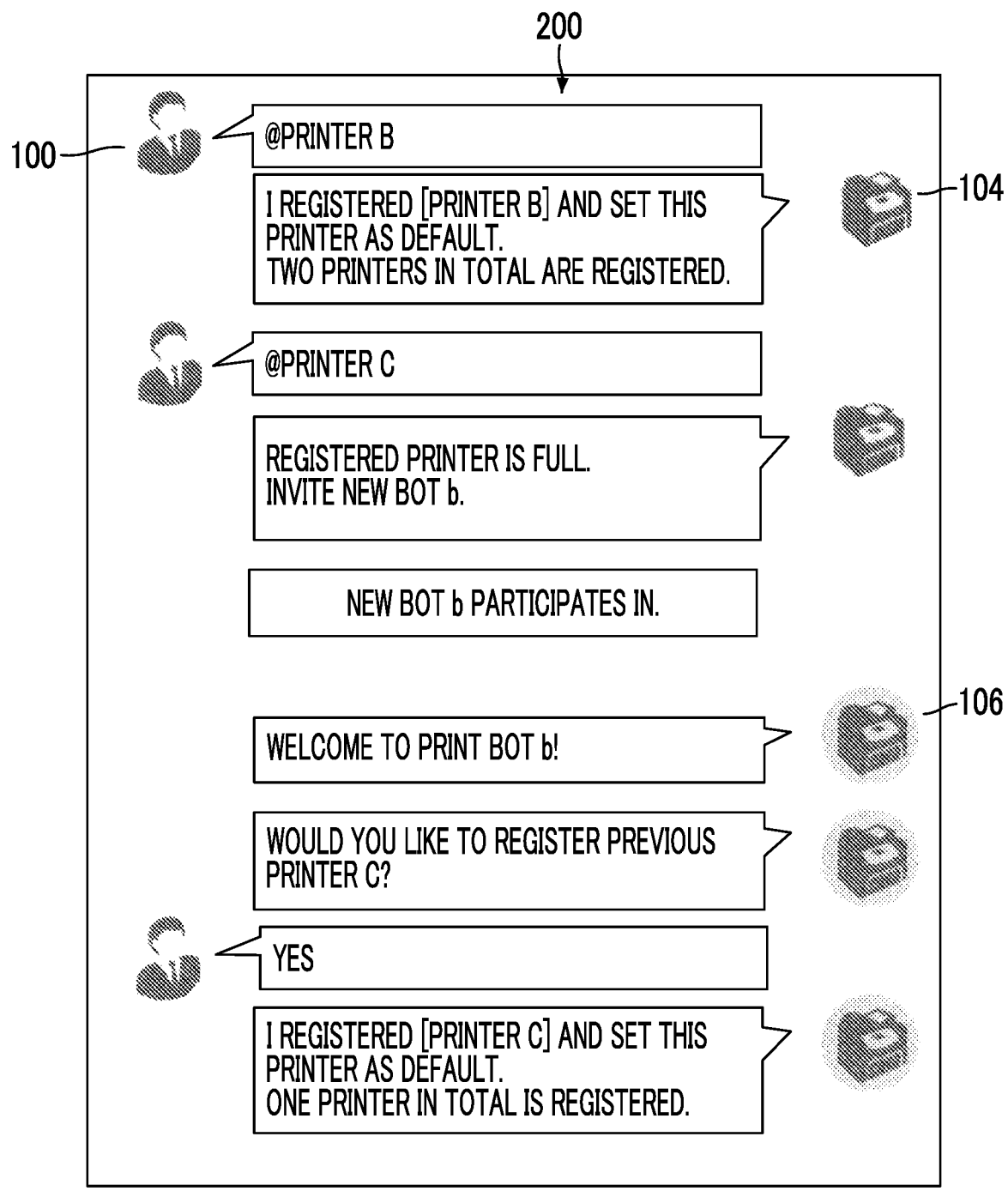
FIG. 15 is a diagram illustrating a screen of a user terminal in a second exemplary embodiment.

FIG. 15 illustrates an example of the screen displayed in the user terminal A operated by the user A in this exemplary embodiment. It is assumed that the user A can use the chatbot a ("friend registration" has been performed).

In FIG. 15, firstly, the user A transmits a message of "@printer B" to the chatbot a.

The chatbot a which has received the message determines that only the printer A is registered in association with the user A and there is still room for one device. Thus, the chatbot a registers the printer B in addition to the printer A, in a setting information table, in association with the user A. The chatbot a creates a message of "I registered the printer B and set this printer as the default. Two printers in total are registered" and automatically transmits the created message as a response.

Then, the user A transmits a message of "@printer C" to the chatbot a.

The chatbot a which has received the message determines that the two printers of the printer A and the printer B have already been registered in association with the user A and reaches the upper limit. The chatbot a creates a message of inviting another chatbot b in this chat room and automatically transmits the created message as a response. For example, the chatbot a creates messages of "the registered printer is full. Invite a new bot b" and "The new bot b participates" and automatically transmits the messages as a response. The chatbot b is caused to participate in this chat room and the icon 106 of the chatbot b is displayed. The chatbot b creates a message of "welcome to print bot b" and automatically transmits the messages as a response.

The chatbot a may check whether or not a new chatbot b may be caused to participate, for the user A. In a case where a positive response is received from the user A, the chatbot a may cause the chatbot b to participate.

The chatbot b creates a message of "would you like to register the previous printer C?" and automatically transmits the message as a response.

The user A who has visually recognized the message transmits a message of "yes".

The chatbot b which has received the message registers information of the user A and the printer C in the setting information table, with associating the user A and the printer C with each other. The chatbot b creates a message of "I registered the printer c and set this printer as default. One printer in total is registered", and automatically transmits the message as a response.

Then, in a case where the user causes the printer A or printer B to perform printing, the user transmits a message of a printing instruction to the chatbot a. In a case where printing is performed by the printer C, the user transmits a message of a printing instruction to the chatbot b. For example, messages of "@chatbot a: perform printing" and "@chatbot b: perform printing" are transmitted. In this case, in the chatbot a, the printer B is set to be the default. Thus, printing is performed by the printer B. Since only the printer C is associated with the chatbot b, the user A may simply transmit a message of an instruction to perform printing to the chatbot b.

Third Exemplary Embodiment

In first and second exemplary embodiments, a chatbot is added in a case where the number of printers cooperating with the chatbot is greater than the upper limit. However, the chatbot may be added in a case where the number of times of switching of the printer cooperating with the chatbot is greater than an upper limit.

Figure 16:
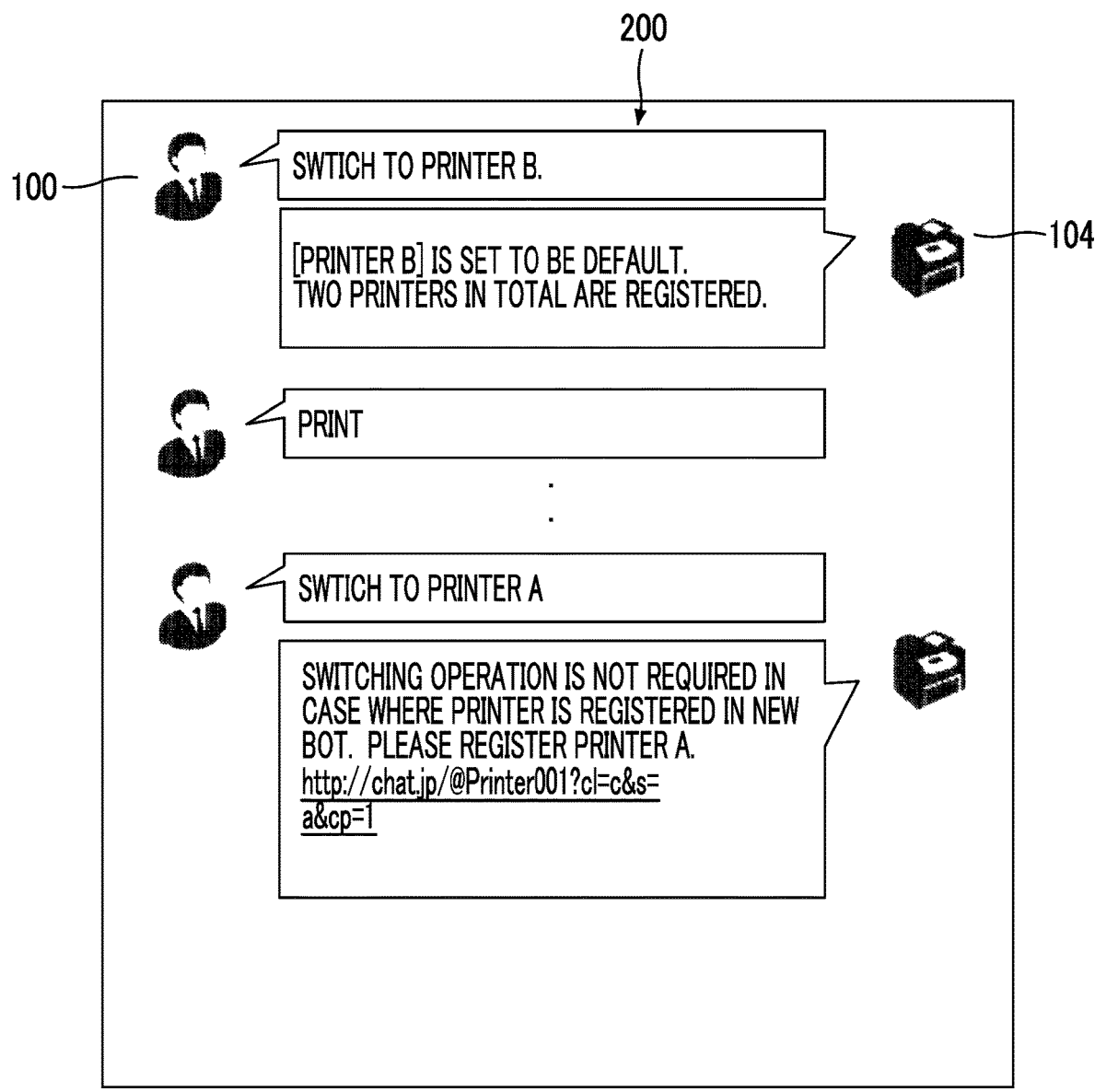
FIG. 16 is a diagram illustrating a screen of a user terminal in a third exemplary embodiment.

FIG. 16 illustrates an example of the screen displayed in the user terminal A operated by the user A in this exemplary embodiment. It is assumed that the user A can use the chatbot a ("friend registration" has been performed). It is assumed that the printer A and the printer B are associated with the chatbot a.

In FIG. 16, firstly, the user A transmits a message of "performing switching to the printer B" to the chatbot a.

The chatbot a which has received the message creates a message of "the printer B is set to be the default printer. Two printers in total are registered" and automatically transmits the message as a response.

Then, the user A transmits a message of an instruction to perform printing, for example, a message of "print" to the chatbot a.

The chatbot a drives the printer B set to be the default, in accordance with the message, so as to execute the print service.

The user A transmits a message of an instruction to perform printing, for example, a message of "switching to printer A", "@printer A: perform printing", or "printing is performed by the printer A", to the chatbot a. The chatbot a switches the printer from the printer B to the printer A in accordance with the message and drives the printer A to execute the print service.

Then, in the similar manner, the printer is switched between the printer A and the printer B in accordance with a message from the user A, and the print service is executed. The chatbot a counts the number of times of switching and the number of times of being used for each printer and registers the number of times of switching and the number of times of being used, in the setting information table.

The chatbot a sequentially counts the number of times of switching and the number of times of being used. After that, the user A transmits a message of "switching to the printer A" at a certain timing.

The chatbot a sets the printer to be switched from the printer B to the printer A in accordance with the message. However, in a case where the number of times of switching to the printer A reaches the upper limit, the chatbot a creates a message of "switching operation is not required in a case where the printer is registered in a new bot. Please register the printer A" and automatically the message and a URL of the chatbot b as a response.

The user A who has visually recognized the message taps the URL included in the message so as to access the chatbot b. The subsequent steps are similar to those in (b) of FIG. 12.

Any value is set as the upper limit of the number of times of switching. However, in a case where the upper limit is set to 1, the number of times of switching is the smallest.

A processing algorithm of the chatbot a and the chatbot b realized by the bot server A will be described in detail, as follows.

Step 1: The chatbot a receives friend registration from the user A and stores the user ID of the user A in the user information storage unit 165.

Step 2: The chatbot a receives a message regarding a registration request of the printer A from the user A. The chatbot a analyzes the contents of the message, and registers information of the user A and the printer A as the setting information of the user A in the setting information table, with associating the user A and the printer A with each other. The setting information table is stored in the setting information storage unit 166.

Step 3: The chatbot a receives a message regarding a request, indicating that the printer is switched to the printer B, from the user A. The chatbot a analyzes the contents of the received message and registers information of the user A and the printer B in the setting information table with associating the user A and the printer B with each other. At this time, the chatbot a determines whether or not the total number of registered printers is greater than the upper limit. In a case where the total number of registered printers is not greater than the upper limit, the chatbot a performs registration.

Step 4: The chatbot a creates a message indicating that two printers of the printer A and the printer B have been registered, and automatically transmits the message as a response to the user A.

Step 5: The chatbot a receives a printing instruction from the user A and executes the print service in the printer A or the printer B. In a case where the printing instruction from the user A includes a keyword (mention) for an instruction to perform printer, for example, a keyword of "@printer A", the chatbot a executes the print service in the printer corresponding to the instruction. In a case where there is no keyword for an instruction to perform printing, the chatbot a executes the print service in the printer which has been set to the default. The chatbot a counts the number of times of switching and the number of times of being used for each printer, and registers the number of times of switching and the number of times of being used, in the setting information table.

Step 6: The chatbot a receives a message regarding a request, indicating that the printer is switched to the printer A, from the user A. The chatbot a analyzes the contents of the received message. In a case where the number of times of switching of the printer A reaches the upper limit and switching to the printer A is performed, the chatbot a rejects the switching because the number of times of switching of the printer is greater than the upper limit. The chatbot a adds a chatbot b having the same function. The chatbot a creates a message indicating that the switching operation is not required in a case of being registered in the chatbot b, and a message including address information (URL or the like) for accessing the chatbot b and automatically transmits the messages to the user A.

Step 7: In a case where the user A accesses the chatbot b, the chatbot b creates a confirmation message of whether or not registration of the printer A to which switching has been rejected by the chatbot a is performed, and automatically transmits the confirmation message as a response.

Step 8: In a case where the chatbot b receives a message as a positive response from the user A, the chatbot b analyzes the contents of the message and registers information of the user A and the printer A as setting information of the user A in the setting information table with associating the user A and the printer A with each other.

Step 9: The chatbot b creates a message indicating that the printer A has been registered and automatically transmits the message to the user A as a response.

FIG. 17 schematically illustrates the update of the setting information table.

Figures 17A, 17B:
FIGS. 17A and 17B are diagrams illustrating an update of a setting information table in the third exemplary embodiment.

FIG. 17A illustrates the setting information table in a state where the chatbot a is associated with the printer A and the printer B. For the user A, the chatbot a (bot a) is associated with the printer A and the printer B. The number of times of switching and the number of times of being used are counted for each printer and are registered. FIG. 17 illustrates an example in which the number of times of switching of the printer A is 10, the number of times of the printer A being used is 20, the number of times of switching of the printer B is 10, and the number of times of the printer B being used is 25. Here, "the number of times of switching of the printer A" means the number of times of switching from the printer B to the printer A. In a case where the upper limit of the number of times of switching is set to 10, and switching from the printer B to the printer A is performed, the number of times of switching is greater than the upper limit. Thus, the chatbot a transmits a message of suggesting registration of the printer A in the chatbot b.

FIG. 17B illustrates the setting information table updated in accordance with a message from the user A. An association between the chatbot a and the printer A is deleted (no entry), and the chatbot b and the printer A are newly associated with each other.

Fourth Exemplary Embodiment

In the third exemplary embodiment, a chatbot is added in a case where the number of times of switching of the printers cooperating with the chatbot is greater than the upper limit. However, in a case where a plurality of chatbots is already provided, an association between the chatbot and the printer may be changed, that is, rearranged in accordance with the number of times of switching of each printer.

Figure 18:
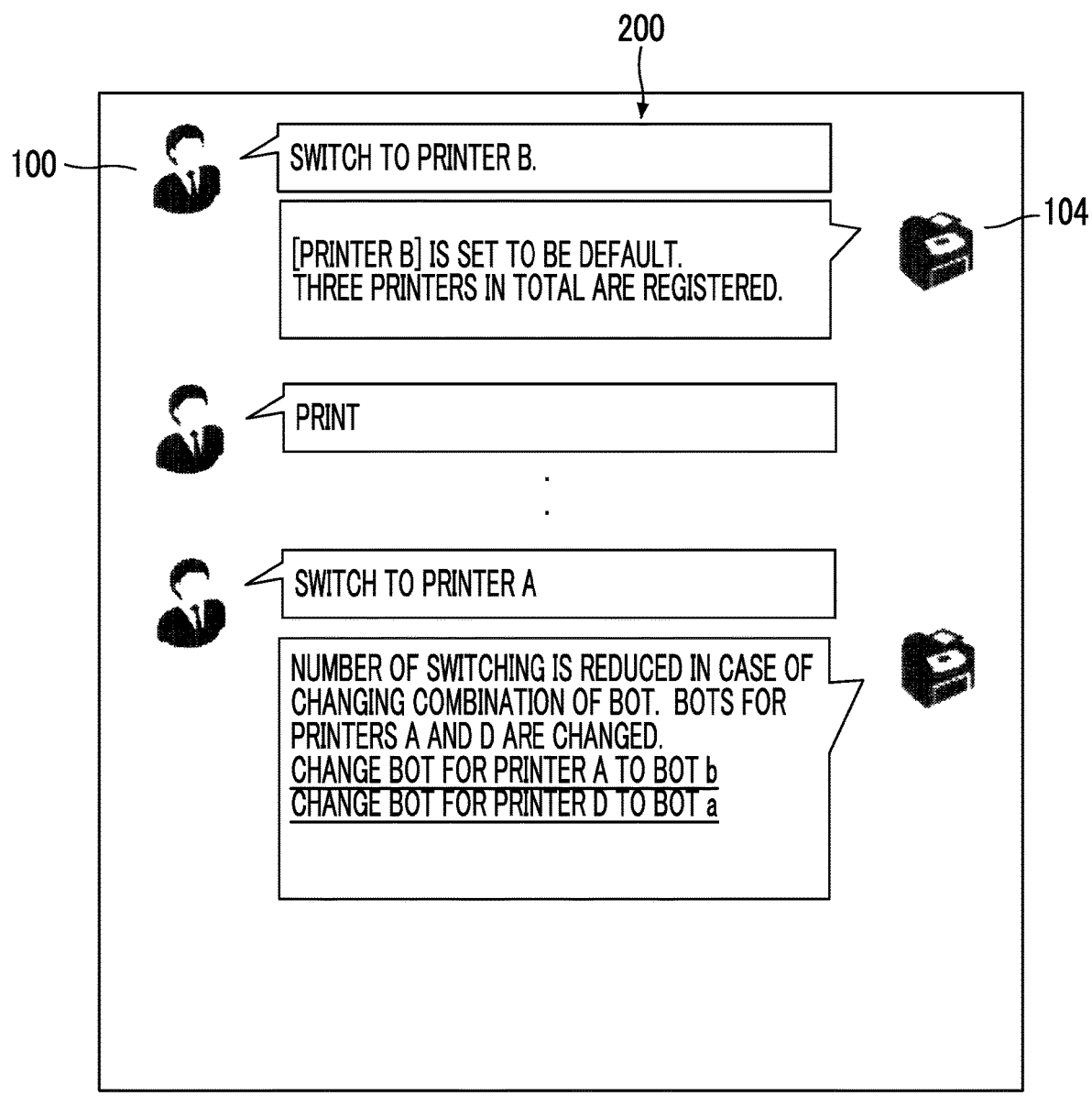
FIG. 18 is a diagram illustrating a screen of a user terminal in a fourth exemplary embodiment.

FIG. 18 illustrates an example of the screen displayed in the user terminal A operated by the user A in this exemplary embodiment. It is assumed that the chatbot a and the chatbot b are already provided as the chatbots, the chatbot a is associated with the printer A, the printer B and the printer C, and the chatbot b is associated with a printer D or a printer E (in the exemplary embodiment, the upper limit of the number of printers which may cooperate with a certain chatbot is set to 3). It is assumed that the user A can uses (performs friend registration with) the chatbot a and the chatbot b.

In FIG. 18, firstly, the user A transmits a message of "switching to the printer B" to the chatbot a.

The chatbot a which has received the message creates a message of "the printer B is set to be the default printer. Three printers in total are registered" and automatically transmits the message as a response.

Then, the user A transmits a message of an instruction to perform printing, for example, a message of "print" to the chatbot a.

The chatbot a drives the printer B set to be the default, in accordance with the message, so as to execute the print service.

The user A transmits a message of an instruction to perform printing, for example, a message of "switching to printer A", "@printer A: perform printing", or "printing is performed by the printer A", to the chatbot a. The chatbot a switches the printer from the printer B to the printer A in accordance with the message and drives the printer A to execute the print service.

Then, in the similar manner, switching between the printer A, the printer B, and the printer C is performed and the print service is executed in accordance with the message from the user A. However, the chatbot a counts the number of times of switching and the number of times of being used for each printer and registers the number of times of switching and the number of times of being used, in the setting information table. The above descriptions are similarly applied for the chatbot b. The chatbot a counts the number of times of switching and the number of times of being used for each printer and registers the number of times of switching and the number of times of being used, in the setting information table.

The chatbot a sequentially counts the number of times of switching and the number of times of being used. After that, the user A transmits a message of "switching to the printer A" to the chatbot a at a certain timing.

The chatbot a switches the printer to the printer A in accordance with the message. In a case where the number of times of switching to the printer A reaches the upper limit, the chatbot a creates a message of "the number of switching operations is reduced in a case of changing a combination of the bot b. Rearrange the printers A and D" and creates a recommended rearrangement pattern. The chatbot a automatically transmits the message and the rearrangement pattern as a response. The chatbot a selects the printer having the minimum number of times of switching, with reference to the number of times of switching of each of the printer D and the printer E associated with the chatbot b and performs swapping for the printer A. That is, in a case where the number of times of switching of the printer D is set to be the smallest, the printer A and the printer D are swapped with each other. The chatbot a updates the setting information table so as to associate the printer D with the chatbot a and to associate the printer A with the chatbot b.

FIG. 19 schematically illustrates the update of the setting information table.

Figures 19A, 19B:
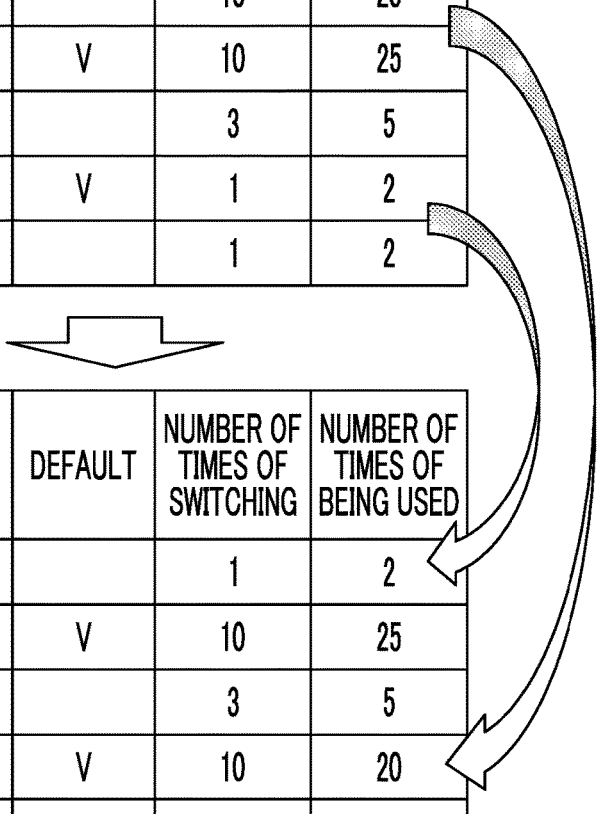
FIGS. 19A and 19B are diagrams illustrating an update of a setting information table in the fourth exemplary embodiment.

FIG. 19A illustrates the setting information table in which the chatbot a is associated with the printer A, the printer B, and the printer C, and the chatbot b is associated with the printers D and E. The number of times of switching and the number of times of being used are counted for each printer and are registered. FIG. 19A illustrates an example in which the number of times of switching of the printer A is 10, the number of times of the printer A being used is 20, the number of times of switching of the printer B is 10, the number of times of the printer B being used is 25, the number of times of switching of the printer C is 3, and the number of times of the printer C being used is 5, the number of times of switching of the printer D is 1, and the number of times of the printer D being used is 2, and the number of times of switching of the printer E is 1, and the number of times of the printer E being used is 2. In a case where the upper limit of the number of times of switching is set to 10 and switching to the printer A is performed, the number of times of switching is greater than the upper limit. Thus, the chatbot a selects the printer D as the printer having the minimum number of times of switching, with reference to the numbers of times of switching the printer D and the printer E associated with the chatbot b (in FIG. 19A, the number of times of switching of the printer D is equal to the number of times of switching of the printer E, and thus any of the printers D and E is selected).

FIG. 19B illustrates the setting information table updated in accordance with a message from the user A. The chatbot a and the printer D are associated with each other, and the chatbot b and the printer A are associated with each other.

As described above, in the exemplary embodiment, a combination of the chatbot and the printer is changed so as to equalize the numbers of times of switching of the printers for each chatbot.

Fifth Exemplary Embodiment

In the third and fourth exemplary embodiments, the association between the chatbot and the printer is changed in accordance with the number of times of switching of the printer. However, the association between the chatbot and the printer may be changed in accordance with the operation condition of the printer, that is, the printing condition of the printer. In a case where a combination of the printer and the printing condition is interpreted as an external device, in a case where the same printer has printing conditions different from each other, the printer may be considered as external devices different from each other.

FIG. 20 schematically illustrates the update of the setting information table.

FIG. 20A illustrates the setting information table in a state where the chatbot a is associated with the printer A and the printer B, and no printer is associated with the chatbot b. A printing condition P1 and a printing condition P2 as the setting information are associated with the printer A. The number of times of switching and the number of times of being used are counted and registered for each printer and each printing condition. FIG. 20A illustrates an example in which the number of times of switching of the printer A and the printing condition P1 is 10, the number of times of the printer A and the printing condition P1 being used is 20, the number of times of switching of the printer A and the printing condition P2 is 10, the number of times of the printer A and the printing condition P2 being used is 25, and the number of times of switching of the printer B is 2, and the number of times of the printer B being used is 4. The printer A and the printing condition P2 are set to the default. In a case where the upper limit of the number of times of switching is set to 10, and switching to the printer A and the printing condition P1 is performed, the number of times of switching is greater than the upper limit. Thus, the chatbot a suggests registration of the printer A and the printing condition P1 in the chatbot b.

FIG. 20B illustrates the setting information table updated in accordance with the message from the user A. The chatbot a is associated with the printer A and the printing condition P2, and the printer B. The chatbot b is associated with the printer A and the printing condition P1.

The association of the chatbot with the printer and the printing condition may be changed, that is, rearranged, in accordance with the number of times of switching of the printer and the printing condition. For example, in a case where the chatbot a is associated with a set of the printer A and the printing condition P1, and a set of the printer A and the printing condition P2, and the chatbot b is associated with a set of the printer B and a printing condition P3 and a set of the printer B and a printing condition P4, rearrangement may be performed by swapping the set of the printer A and the printing condition P1 with the set of the printer B and the printing condition P4.

Hitherto, the exemplary embodiments of the invention are described. However, the invention is not limited to the above-described exemplary embodiments, and various modifications may be made. Modification examples will be described below.

Modification Example 1

In the exemplary embodiments, the chatbot is sequentially added in a case where the predetermined condition is satisfied. As the predetermined condition, the followings may be provided: (1) a case where the number of printers cooperating with one chatbot is greater than the upper limit; (2) a case where the number of times of switching of the printer cooperating with one chatbot is greater than the upper limit; (3) a case where the number of times of switching of the printing condition of the printer cooperating with one chatbot is greater than the upper limit; (4) a case where the number of times of using the printer cooperating with one chatbot is greater than the upper limit; (5) a case where a difference between the maximum value and the minimum value of the number of times of using the printer cooperating with one chatbot is greater than an upper limit; and (6) a case where a request message indicating that a chatbot is to be added is received from the user.

In short, in a case where the chatbot cooperates with a plurality of printers, the chatbot may be sequentially added and associated with the printer such that the number of times of switching between the plurality of printers is reduced more.

Modification Example 2

In the exemplary embodiments, the chatbot b is added in accordance with the number of times of switching. However, in a case where a message of an instruction to perform printing by a printer other than the printer set as the default is received from the user, the chatbot b may be added and associated with the printer in accordance with the received message. In this case, the chatbot may be added in accordance with the number of times of switching of the printer set as the default, such that the number of times of switching is set to 0 or is minimized.

Modification Example 3

In the exemplary embodiments, the icons of the chatbot a and the chatbot b are displayed on the screen of the user terminal. However, for example, it is desirable that the icons are displayed such that at least any of the names, the colors, or the shapes of the icons are different from each other, and thus the user can distinguish the chatbot a and the chatbot b from each other. Since the chatbot a and the chatbot b have the same function, for example, it is desirable to make a difference within a range with maintaining the commonality of the function.

Modification Example 4

In the exemplary embodiments, an example in which the chatbot provides the print service in accordance with a message from a user is described. However, the chatbot may provide any service in addition to the print service. Examples of the service are as follows.

Figure 21:
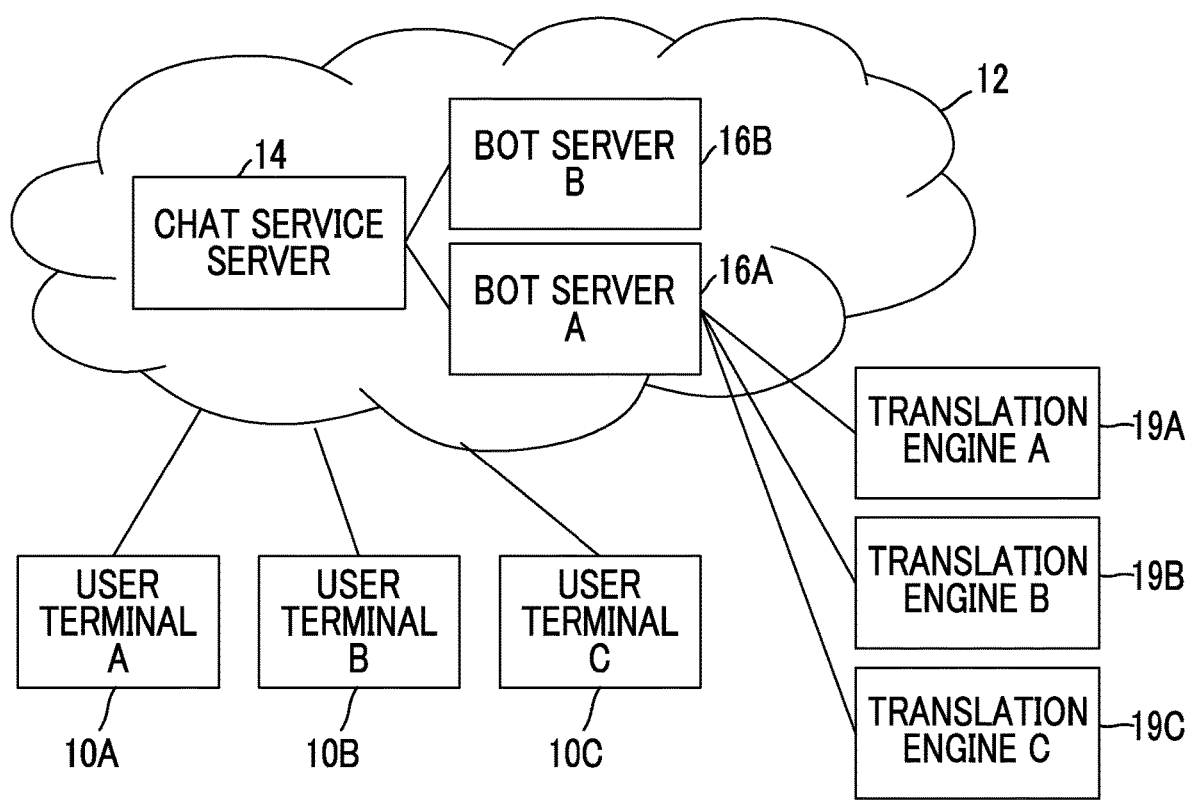
FIG. 21 is a system configuration diagram according to a modification example.

Search service of music, news articles, accommodations, books, cooking recipes, and the like Ticket reservation service Listing/search/transaction contact service to flea market Translation service to other languages FIG. 21 is a diagram illustrating a system configuration in a case where a translation service is executed. Different from FIG. 1, the message service system includes a translation engine A (19A), a translation engine (19B), and a translation engine C (19C) as external devices, instead of the printer A (18A), the printer B (18B), and the printer C (18C). The translation engine A corresponds to a program of translating Japanese into English (and a translation device on which the program is installed). The translation engine B corresponds to a program of translating Japanese into Chinese (and a translation device on which the program is installed). The translation engine C corresponds to a program of translating Japanese into Spanish (and a translation device on which the program is installed).

The user A selects the translation engine A, and sets and registers a format for displaying the original Japanese following the English translation, as the setting information. Thus, in a case where the user A transmits a message of "Are you free today?" to the chatbot, the chatbot drives the translation engine A to automatically transmits a message of "今日は空いていますか？" and "Are you free today?" as a response.

In a case where the number of translation engines cooperating with one chatbot has an upper limit (for example, 2), the translation engine A and the translation engine B already cooperate with the chatbot, and the user desires translation by the translation engine C, a new chatbot is added, and the added chatbot is associated with the translation engine C.

In a case of the search service, a search engine may be used as the external device, instead of the translation engine. In this case, the setting information corresponds to a search condition. For example, in the search of accommodation facilities, the number of days, the price, the grade of the hotel, and the number of people may be included in the setting information. In a case where the number of times of switching of the search condition reaches an upper limit, a new chatbot is added, and the added chatbot is associated with a search engine having a specific search condition. The combination of the printer and the printing condition in FIG. 20 may be replaced with a combination of the search engine and the search condition.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A message providing device comprising:
a processor, configured to:
receive a registration request for an association of a software robot program with an external device for each user, the software robot program operating on a message service in which a message is transmitted and received between users, to transmit and receive the message to and from a user; and
provide a plurality of same software robot programs for one user and registers a plurality of external devices different from each other in association with the plurality of same software robot programs in accordance with the request from the user, wherein each of the plurality of same software robot programs is respectively in association with at least one different external device among the plurality of external devices.

2. The message providing device according to claim 1, wherein, in a case of satisfying a predetermined condition, the processor sequentially and additionally provides the software robot program for the user.

3. The message providing device according to claim 1, wherein the processor provides the one software robot program for the user in an initial state, and
the processor additionally provides the software robot program for the user in a case of satisfying a predetermined condition.

4. The message providing device according to claim 2, wherein the predetermined condition means that the number of external devices associated with the one software robot program is greater than an upper limit.

5. The message providing device according to claim 3, wherein the predetermined condition means that the number of external devices associated with the one software robot program is greater than an upper limit.

6. The message providing device according to claim 2, wherein the predetermined condition means that the number of times of switching between the external devices associated with the one software robot program is greater than an upper limit.

7. The message providing device according to claim 3, wherein the predetermined condition means that the number of times of switching between the external devices associated with the one software robot program is greater than an upper limit.

8. The message providing device according to claim 2, wherein the predetermined condition means that the number of times of switching between operation conditions of the external devices associated with the one software robot program s greater than an upper limit.

9. The message providing device according to claim 3, wherein the predetermined condition means that the number of times of switching between operation conditions of the external devices associated with the one software robot program is greater than an upper limit.

10. The message providing device according to claim 1, wherein the processor registers the plurality of external devices different from each other in association with the plurality of same software robot programs, in accordance with the registration request from the user.

11. The message providing device according to claim 1, wherein the processor registers the plurality of external devices different from each other in association with the plurality of same software robot programs, in accordance with a switching request of the external device from the user.

12. The message providing device according to claim 1, wherein the processor changes an association between the plurality of same software robot programs, and the plurality of external devices different from each other, in accordance with a request from the user and performs registration.

13. The message providing device according to claim 12, wherein the processor changes the association between the plurality of same software robot programs, and the plurality of external devices different from each other, in accordance with the number of times of switching between the external devices, and performs registration.

14. The message providing device according to claim 12, wherein the processor changes the association between the plurality of same software robot programs, and the plurality of external devices different from each other, in accordance with the number of times of switching between operation conditions of the external devices, and performs registration.

15. The message providing device according to claim 1, wherein the external device is a printing device.

16. The message providing device according to claim 2, wherein the external device is a printing device.

17. The message providing device according to claim 3, wherein the external device is a printing device.

18. The message providing device according to claim 4, wherein the external device is a printing device.

19. The message providing device according to claim 1, wherein the plurality of same software robot programs comprise a first software robot program and a second software robot program, wherein the plurality of external devices comprise a first external device and a second external device, wherein the first software program is in association with the first external device, and wherein the second software program is in association with the second external device.

20. The message providing device according to claim 1, wherein the first external device provides a first service, and wherein the second external provides a second service different from the first service.

21. A non-transitory computer readable medium storing a program causing a computer to:
receive a registration request for an association of a software robot program with an external device for each user, the software robot program operating on a message service in which a message is transmitted and received between users, to transmit and receive the message to and from a user; and
provide a plurality of same software robot programs for one user and registers a plurality of external devices different from each other in association with each of the plurality of same software robot programs in accordance with the request from the user, wherein each of the plurality of same software robot programs is respectively in association with at least one different external device among the plurality of external devices.

22. A display control method comprising:
receiving a registration request for an association of a software robot program with an external device for each user, the software robot program operating on a message service in which a message is transmitted and received between users, to transmit and receive the message to and from a user; and
displaying a message on a screen in accordance with a request from one user, the message being for suggesting registration of a plurality of external devices different from each other in association with each of a plurality of same software robot programs in a case of satisfying a predetermined condition, wherein each of the plurality of same software robot programs is respectively in association with at least one different external device among the plurality of external devices.

* * * * *